(12) United States Patent
Li et al.

(10) Patent No.: US 11,005,737 B2
(45) Date of Patent: May 11, 2021

(54) DATA PROCESSING METHOD AND APPARATUS

(71) Applicant: HUAWEI TECHNOLOGIES CO., LTD., Guangdong (CN)

(72) Inventors: Zhenguo Li, Hong Kong (CN); Ge Luo, Shanghai (CN); Ke Yi, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 40 days.

(21) Appl. No.: 16/245,717

(22) Filed: Jan. 11, 2019

(65) Prior Publication Data

US 2019/0149438 A1 May 16, 2019

Related U.S. Application Data

(63) Continuation of application No. PCT/CN2017/079781, filed on Apr. 7, 2017.

(30) Foreign Application Priority Data

Jul. 12, 2016 (CN) .......................... 201610548411.3

(51) Int. Cl.
  *G06F 15/173* (2006.01)
  *H04L 12/26* (2006.01)
(52) U.S. Cl.
  CPC ............ *H04L 43/04* (2013.01); *H04L 43/026* (2013.01); *H04L 43/10* (2013.01); *H04L 43/16* (2013.01)
(58) Field of Classification Search
  CPC ......... H04L 43/04; H04L 43/16; H04L 43/10; H04L 43/026
  See application file for complete search history.

(56) References Cited

U.S. PATENT DOCUMENTS

| 6,553,127 B1 | 4/2003 | Kurowski |
| 7,747,465 B2 | 6/2010 | Srinivasan et al. |

(Continued)

FOREIGN PATENT DOCUMENTS

| CA | 2947158 A1 * | 11/2015 | .......... G06F 11/3037 |
| CN | 1301462 A | 6/2001 | |

(Continued)

OTHER PUBLICATIONS

J. O. Rourke, An on-line algorithm for fitting straight lines between data ranges, Communications of the ACM, vol. 24, No. 9, 1981, 5 pages.

(Continued)

*Primary Examiner* — Richard G Keehn
(74) *Attorney, Agent, or Firm* — Fish & Richardson P.C.

(57) ABSTRACT

A data processing method, includes receiving a data flow; generating a triplet set according to the data flow, where each triplet in the set includes three items, the first item is a first element in the data flow, the second item includes a first time point at which the first element appears in the data flow and a first quantity of times that corresponds to the first time point, and the third item includes a second time point at which the first element appears in the data flow and a second quantity of times that corresponds to the second time point; and performing data processing on the data flow according to the triplet set. In the embodiments of the present application, the triplet set may be generated based on the data flow.

20 Claims, 8 Drawing Sheets

Establish, according to a data flow, multiple step frequency flows that are in a one-to-one correspondence with multiple first elements — S201

Generate a triplet set according to the multiple step frequency flows that are in a one-to-one correspondence with the multiple first elements — S202

(56) References Cited

U.S. PATENT DOCUMENTS

| | | | | |
|---|---|---|---|---|
| 8,339,974 | B1* | 12/2012 | Dawson | H04L 63/1458 370/235 |
| 8,477,648 | B2 | 7/2013 | Breslin et al. | |
| 2010/0054151 | A1 | 3/2010 | Droz et al. | |
| 2011/0199924 | A1* | 8/2011 | Breslin | H04L 43/0882 370/252 |
| 2014/0266765 | A1 | 9/2014 | Neeley et al. | |
| 2015/0212868 | A1 | 7/2015 | Chen et al. | |
| 2015/0295807 | A1* | 10/2015 | Huang | H04L 43/10 709/224 |
| 2017/0096986 | A1 | 4/2017 | Takeuchi et al. | |
| 2017/0098010 | A1 | 4/2017 | Kohinata et al. | |
| 2017/0366197 | A1 | 12/2017 | Li et al. | |

FOREIGN PATENT DOCUMENTS

| | | | | |
|---|---|---|---|---|
| CN | 102509062 | A | 6/2012 | |
| CN | 102722542 | A | 10/2012 | |
| CN | 103729429 | A | 4/2014 | |
| CN | 103970602 | A | 8/2014 | |
| CN | 105680868 | A | 6/2016 | |
| EP | 1130850 | A2 | 9/2001 | |
| WO | WO-2008014154 | A2 * | 1/2008 | G16H 40/63 |
| WO | 2015146705 | A1 | 10/2015 | |
| WO | 2016046929 | A1 | 3/2016 | |

OTHER PUBLICATIONS

International Search Report and Written Opinion issued in International Application No. PCT/CN2017/079781 dated Jul. 6, 2017, 16 pages.

Extended European Search Report issued in European Application No. 17826801.7 dated Mar. 4, 2019, 9 pages.

Office Action issued in Chinese Application No. 201610548411.3 dated Jun. 2, 2020, 10 pages (with English translation).

* cited by examiner

DATA PROCESSING METHOD AND APPARATUS

CROSS-REFERENCE TO RELATED APPLICATIONS

This application is a continuation of International Application No. PCT/CN2017/079781, filed on Apr. 7, 2017, which claims priority to Chinese Patent Application No. 201610548411.3, filed on Jul. 12, 2016. The disclosures of the aforementioned applications are hereby incorporated by reference in their entireties.

TECHNICAL FIELD

Embodiments of the present application relate to the communications field, and more specifically, to a data processing method and apparatus.

BACKGROUND

A data flow is a sequence of data that arrives sequentially, rapidly, and continuously in a large quantity. Generally, a data flow may be considered as a set of dynamic data that increases infinitely with time. A data flow widely appears in application fields such as network monitoring, sensor networks, aerospace, meteorological measurement and control, and financial services, and satellite cloud picture monitoring, stock market trend analysis, network attack determining, and the like may be performed through research on the data flow.

In fields such as network monitoring, virus detection, trend prediction, and exception analysis, to find a change trend of an element in a data flow is an important aspect in signal detection and is of great instructive significance in signal detection.

In common application, usually a quantity of times that an element appears in a data flow only at a current time point is considered. If data at a historical time point is not recorded and stored in time, the data cannot be queried at the current time point, leading to an information loss. Therefore, currently, how to implement global monitoring on a data flow is a technical bottleneck that urgently needs to be resolved.

SUMMARY

Embodiments of the present application provide a data processing method, so as to implement global monitoring on a data flow.

According to a first aspect, a data processing method is provided, including:

receiving a data flow, where the data flow includes multiple data points, and data information of each data point includes a collection time point at which the data point is collected and an element collected at the collection time point;

generating a triplet set according to the data flow, where each triplet in the set includes three items, the first item is a first element in the data flow, the second item includes a first time point at which the first element appears in the data flow and a first quantity of times that corresponds to the first time point, and the third item includes a second time point at which the first element appears in the data flow and a second quantity of times that corresponds to the second time point; and performing data processing on the data flow according to the triplet set.

In the embodiments of the present application, the triplet set may be generated based on the data flow. Because correspondences between quantities of times of multiple first elements and a time point are stored in the triplet set, quantities of times of the multiple first elements at a historical time point can be obtained according to the triplet set, so that global monitoring can be implemented.

With reference to the first aspect, in some implementations of the first aspect, the generating a triplet set according to the data flow includes:

establishing, according to the data flow, multiple step frequency flows that are in a one-to-one correspondence with the multiple first elements, where each of the multiple step frequency flows includes multiple first-element data points, each first-element data point includes a third time point and a third quantity of times, the third time point is a time point at which the first element appears in the data flow, and the third quantity of times is a quantity of times that the first element appears in the data flow by the third time point; and generating the triplet set according to the multiple step frequency flows that are in a one-to-one correspondence with the multiple first elements.

In this way, in the embodiments of the present application, the multiple step frequency flows may be established based on the data flow, where one step frequency flow corresponds to one first element, so that a triplet that corresponds to a first element can be further determined according to each step frequency flow. In a process of generating a triplet for a particular step frequency flow, a small quantity of data is processed in the process, and efficiency is relatively high.

With reference to the first aspect, in some implementations of the first aspect, the generating a triplet set according to the data flow includes:

establishing M four-tuples according to the data flow, where the first item of each of the M four-tuples is the first element, the second item is a quantity of times that the first element appears in the data flow by a current time point, the third item is an algorithm for determining the fourth item based on the data flow, the fourth item includes multiple two-tuples, the first item of each two-tuple is the first time point and the first quantity of times, and the second item is the second time point and the second quantity of times; and generating the triplet set according to the M four-tuples.

With reference to the first aspect, in some implementations of the first aspect, the establishing M four-tuples according to the data flow includes:

updating the M four-tuples according to a newly obtained data point in the data flow.

With reference to the first aspect, in some implementations of the first aspect, the updating the M four-tuples according to a newly obtained data point in the data flow includes:

determining whether a second element of the newly obtained data point exists in the M four-tuples; and if the first item of a first four-tuple in the M four-tuples is the second element, updating the first four-tuple; or if the second element does not exist in the first items of the M four-tuples, adding the second element to a second four-tuple in the M four-tuples.

With reference to the first aspect, in some implementations of the first aspect, the updating the first four-tuple includes:

increasing the second item of the first four-tuple by 1, to update the second item to a new quantity of times of the second element; and inputting a collection time point of the newly obtained data point and the new quantity of times to the algorithm in the third item.

With reference to the first aspect, in some implementations of the first aspect, the adding the second element to a second four-tuple in the M four-tuples includes:

updating the second four-tuple if in the M four-tuples, a quantity of four-tuples whose second items are greater than 0 is less than a preset threshold, where the second four-tuple is a four-tuple whose second item is equal to 0 in the M four-tuples; or updating the second four-tuple if in the M four-tuples, a quantity of four-tuples whose second items are greater than 0 is equal to a preset threshold, where the second four-tuple is a four-tuple whose second item is the smallest in the M four-tuples.

The updating the second four-tuple if in the M four-tuples, a quantity of four-tuples whose second items are greater than 0 is less than a preset threshold, where the second four-tuple is a four-tuple whose second item is equal to 0 in the M four-tuples includes: using the four-tuple whose second item is equal to 0 in the M four-tuples as the second four-tuple, updating the first item of the second four-tuple to the second element, and updating the second item to 1, where the third item includes a data point that includes a collection time point of the second element and the quantity of times being 1, and the fourth item is empty.

The updating the second four-tuple if in the M four-tuples, a quantity of four-tuples whose second items are greater than 0 is equal to a preset threshold, where the second four-tuple is a four-tuple whose second item is the smallest in the M four-tuples includes: outputting multiple corresponding triplets according to the four-tuple whose second item is the smallest in the M four-tuples; and using the four-tuple whose second item is the smallest in the M four-tuples as the second four-tuple, updating the first item of the second four-tuple to the second element, and updating the second item to a new quantity of times by increasing the second item by 1, where the third item includes a data point that includes the collection time point of the second element and the new quantity of times, and the fourth item is empty.

With reference to the first aspect, in some implementations of the first aspect, if in the M four-tuples, the quantity of four-tuples whose second items are greater than 0 is less than the preset threshold, the four-tuple whose second item is equal to 0 in the M four-tuples is used as the second four-tuple, the first item of the second four-tuple is updated to the second element, and the second item is updated to 1, where the third item includes the data point that includes the collection time point of the second element and the quantity of times being 1, and the fourth item is empty. If in the M four-tuples, the quantity of four-tuples whose second items are greater than 0 is equal to the preset threshold, the multiple corresponding triplets are output according to the four-tuple whose second item is the smallest in the M four-tuples; and the four-tuple whose second item is the smallest in the M four-tuples is used as the second four-tuple, the first item of the second four-tuple is updated to the second element, and the second item is updated to the new quantity of times by increasing the second item by 1, where the third item includes the data point that includes the collection time point of the second element and the new quantity of times, and the fourth item is empty.

With reference to the first aspect, in some implementations of the first aspect, the M four-tuples are sequenced according to values of the second items of the four-tuples.

With reference to the first aspect, in some implementations of the first aspect, the performing data processing on the data flow according to the triplet set includes:

obtaining a query instruction for a heavy hitter, where the query instruction includes a query time point and query frequency;

determining a total quantity of data points in the data flow by the query time point;

obtaining a first triplet from the set according to the query time point, where the query time point is between a first time point and a second time point of the first triplet;

determining, according to the first triplet, a fourth quantity of times that corresponds to the query time point; and if the fourth quantity of times is greater than or equal to a product of the query frequency and the quantity, determining a first element that corresponds to the first triplet as a heavy hitter at the query time point.

In this way, in the embodiments of the present application, a heavy hitter that is in the data flow and that satisfies query frequency at any query time point can be obtained according to the triplet set.

With reference to the first aspect, in some implementations of the first aspect, the performing data processing on the data flow according to the triplet set includes:

obtaining any first element;

obtaining multiple second triplets in the set that correspond to the any first element, where the first item of each of the multiple second triplets is the any first element; and determining, according to the multiple second triplets, a rule that a quantity of times that the any first element appears in the data flow changes with time.

In this way, in the embodiments of the present application, a change rule of frequency that any first element appears in the data flow can be obtained according to the triplet set.

According to a second aspect, a data processing apparatus is provided, including:

an obtaining unit, configured to receive a data flow, where the data flow includes multiple data points, and data information of each data point includes a collection time point at which the data point is collected and an element collected at the collection time point;

a generation unit, configured to generate a triplet set according to the data flow received by the obtaining unit, where each triplet in the set includes three items, the first item is a first element in the data flow, the second item includes a first time point at which the first element appears in the data flow and a first quantity of times that corresponds to the first time point, and the third item includes a second time point at which the first element appears in the data flow and a second quantity of times that corresponds to the second time point; and a processing unit, configured to perform data processing on the data flow according to the triplet set generated by the generation unit.

The apparatus can be configured to implement the data processing method according to the first aspect and the implementations of the first aspect.

According to a third aspect, a data processing apparatus is provided, and the apparatus includes a processor, a memory, and a transceiver. The memory is configured to store code; the processor is configured to execute the code in the memory; and when executing the code, the processor may implement the data processing method according to the first aspect and the implementations.

According to a fourth aspect, a computer readable storage medium is provided. A program is stored in the computer readable storage medium, and the program enables a terminal device to perform the data processing method according to any one of the first aspect or the implementations of the first aspect.

DESCRIPTION OF EMBODIMENTS

Figure 1:
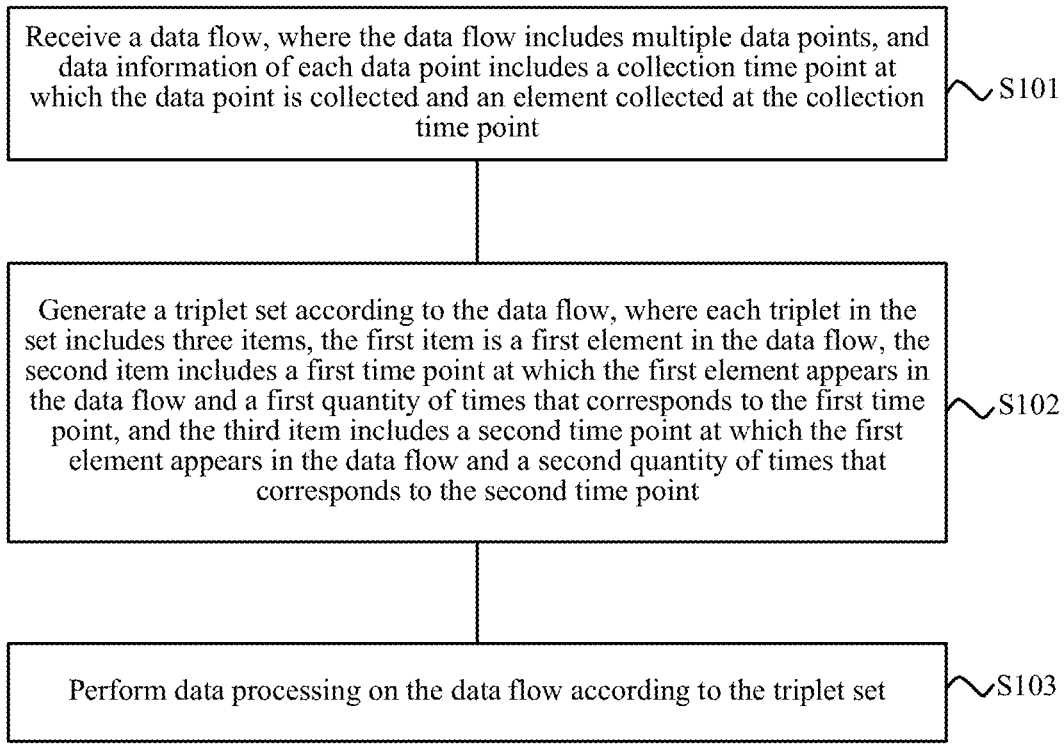
FIG. 1 is a flowchart of a data processing method according to an embodiment of the present application.

The following describes the technical solutions in the embodiments of the present application with reference to the accompanying drawings.

A data flow may be represented as a time sequence $S=\{p_1, p_2, \ldots, p_i, \ldots\}$. The data flow includes multiple data points, and each of the data points may be represented as a value $p_i=(t_i, y_i)$ in the time sequence. A collection time point of a data point is $t_i$, and an element collected at the collection time point is $y_i$. That is, data information of a data point may include a collection time point and an element collected at the collection time point. Alternatively, it may be understood that any item $p_i=(t_i, y_i)$ in the time sequence S means that a data value collected at a time point $t_i$ is $y_i$. In addition, a data flow may also be referred to as flow data, and an element collected at a collection time point may also be referred to as a data value collected at the collection time point. This is not limited in the present application.

It may be understood that a data flow includes multiple data points, and each data point includes two numerals that respectively represent a collection time point and an element collected at the collection time point. The element herein may be collected periodically or aperiodically and may be obtained in a manner of gathering, measurement, or the like.

A physical meaning of an element is related to an original source of a data flow. Correspondingly, a value of the element is related to a specific scenario of the data flow. For example, the element may be a scalar value, may be a vector value, or may be a color, a gender, or a place. This is not limited in the embodiments of the present application.

For example, if the data flow is generated by monitoring network traffic, the element represents the network traffic. It may be understood that the element in this case is a non-negative value.

For example, if the data flow is generated by tracking an MBB digit trail, the element represents coordinates of the trail.

For example, if the data flow is generated by measuring a sea water temperature, the element represents the sea water temperature. It may be understood that the element in this case is greater than or equal to absolute zero.

For example, if the data flow is generated by observing a share price in the stock market, the element represents the share price. It may be understood that the element in this case is a positive number.

It may be understood that in a data flow, collection time points of different data points are different, and elements collected for the different data points may be the same or may be different. For example, for two data points $p_i=(t_i, y_i)$ and $p_j=(t_j, y_j)$ in a same data flow, usually, $t_i \neq t_j$. However, a value relationship between $y_i$ and $y_j$ is related to a specific scenario, and the relationship may be $y_i=y_j$ or $y_i \neq y_j$. If $y_i=y_j$, it is considered that for the two data points $p_i=(t_i, y_i)$ and $p_j=(t_j, y_j)$, a same element is collected. If $y_i \neq y_1$, it is considered that for the two data points $p_i=(t_i, y_i)$ and $p_j=(t_j, y_j)$, different elements are collected.

A global monitoring technology means that for a given data flow and any given query time point (a current time point or earlier), a feature of the data flow by the query time point is determined.

FIG. 1 is a flowchart of a data processing method according to an embodiment of the present application. The method shown in FIG. 1 includes the following steps:

S101. Receive a data flow, where the data flow includes multiple data points, and data information of each data point includes a collection time point at which the data point is collected and an element collected at the collection time point.

S102. Generate a triplet set according to the data flow, where each triplet in the set includes three items, the first item is a first element in the data flow, the second item includes a first time point at which the first element appears in the data flow and a first quantity of times that corresponds to the first time point, and the third item includes a second time point at which the first element appears in the data flow and a second quantity of times that corresponds to the second time point.

S103. Perform data processing on the data flow according to the triplet set.

In this embodiment of the present application, historical data of a data flow is stored by using a triplet set. In this way, global monitoring can be implemented on the data flow.

In this embodiment of the present application, it is assumed that a total quantity of data points in the data flow obtained in S101 is N0, and it is assumed that a quantity of elements collected in N data points in the data flow is K0. Both N0 and K0 are positive integers. In addition, usually K0<N0.

In this embodiment of the present application, it is assumed that a quantity of triplets in the set generated in S102 is N1, and it is assumed that a quantity of multiple first elements in the set is K1. Both N1 and K1 are positive integers. In addition, usually K1<N1.

Optionally, the quantity of triplets may be equal to the quantity of data points in the data flow. In this way, storage of the data flow may be completed in a triplet form, to facilitate further processing on the data flow subsequently.

Optionally, in this embodiment of the present application, the quantity of triplets is less than the quantity of data points in the data flow. For example, the quantity of triplets is less than one ten-thousandth or even one ten-millionth of the quantity of data points. In this way, storage space can be saved. In addition, the triplet set can also facilitate further processing on the data flow subsequently.

Each triplet in the set in this embodiment of the present application includes three items. The first item is referred to as a first element, the second item includes a two-tuple of a first time point and a first quantity of times, and the third item includes another two-tuple of a second time point and a second quantity of times. Both the first time point and the second time point belong to collection time points of the data flow. Usually, the second time point is later than the first time point, and the second quantity of times is greater than the first quantity of times. A difference between the second quantity of times and the first quantity of times may be equal to 1 or greater than 1.

It should be noted that the first quantity of times and the second quantity of times herein may be positive integers, or may be positive non-integers, that is, the first quantity of times or the second quantity of times may be a positive number that includes a decimal. This description is described in detail in subsequent embodiments.

Optionally, a total quantity of first elements in the set may be equal to a total quantity of elements that appear in the data flow, or a total quantity of first elements in the set may be less than a total quantity of elements in the data flow. In this way, storage space can be saved. Specifically, multiple first elements may be multiple elements whose quantities of appearance times in the data flow are relatively large (for example, greater than a preset threshold of a quantity of times).

That is, in this embodiment of the present application, K1=K0 or K1<K0.

In addition, the set may include multiple subsets. Triplets in which different first elements are located belong to different subsets. That is, the set includes multiple subsets that are in a one-to-one correspondence with multiple first elements. For example, the first item of each triplet in a subset 1 is a first element A1, the first item of each triplet in a subset 2 is a second element A2, and A1≠A2.

It may be understood that in a process of storing the triplet set, all triplets in a same subset may share a same first item, so that storage space can be further saved.

The triplet set is described in a relatively detailed manner in subsequent embodiments of the present application.

Figure 2:
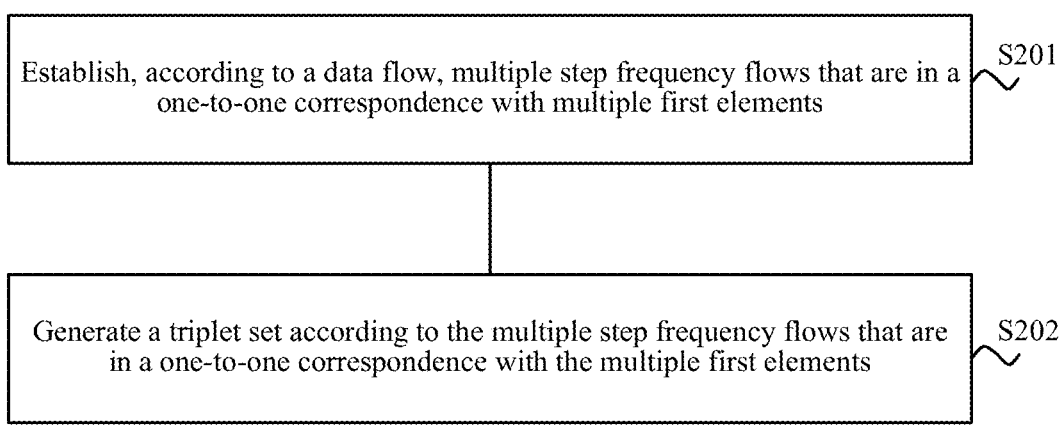
FIG. 2 is a flowchart of a method for generating a triplet set according to an embodiment of the present application.

Optionally, in an implementation, as shown in FIG. 2, S102 may include:

S201. Establish, according to the data flow, multiple step frequency flows that are in a one-to-one correspondence with the multiple first elements, where each of the multiple step frequency flows includes multiple first-element data points, each first-element data point includes a third time point and a third quantity of times, the third time point is a time point at which the first element appears in the data flow, and the third quantity of times is a quantity of times that the first element appears in the data flow by the third time point.

S202. Generate the triplet set according to the multiple step frequency flows that are in a one-to-one correspondence with the multiple first elements.

Specifically, for a particular first element (such as a first element A4), a time point at which the first element appears in the data flow is recorded, and a step frequency flow that corresponds to the first element is updated according to the time point.

Optionally, in an implementation, all third quantities of times in the step frequency flow that corresponds to the first element may form an arithmetic progression whose tolerance is 1. That is, all first-element data points in the step frequency flow that corresponds to the first element are sequenced in ascending order according to values of third time points. The corresponding third quantities of times also increase progressively, and a difference between every two neighboring third quantities of times is 1.

The first element A4 is used as an example. For example, in a data flow S={$(t_1, y_1), (t_2, y_2), \ldots, (t_i, y_i), \ldots$}, assuming that $y_1=y_5=A4$, $y_2\neq A4$, $y_3\neq A4$, and $y_4\neq A4$, it may be learned that a first first-element data point of a step frequency flow that corresponds to the first element A4 is $(t_1, 1)$, and a second first-element data point is $(t_5, 2)$.

The step frequency flow that corresponds to the first element is represented as S3={$(T_1, 1), (T_2, 2), \ldots, (T_i, i), \ldots$}. It may be learned that the step frequency flow is a new data flow. Generally, a data flow includes a collection time point and an element collected at the collection time point. Herein, for the step frequency flow, a collection time point of the step frequency flow is a collection time point of the first element, and an element of the step frequency flow is a quantity of times that the first element appears in the data flow at the collection time point.

Usually, a quantity of data points (that is, first-element data points) of the step frequency flow is apparently less than a quantity of data points of the foregoing data flow S. In addition, a collection time point of a data point in the step frequency flow is a time point at which the first element appears in the data flow S, or may be a time point at which a quantity of times that the first element appears in the data flow changes. It may be understood that a time interval of the step frequency flow is determined according to a location of the first element that appears in the data flow, and the interval is usually variable in length.

Further, in S202, a triplet that corresponds to the first element may be determined according to the step frequency flow that corresponds to the first element.

That is, the first item of the triplet obtained according to the step frequency flow that corresponds to the first element is the first element. Alternatively, it may be understood that a subset of the triplet of the corresponding first element may be obtained according to the step frequency flow.

The triplet set in S102 may be obtained by separately performing the determining process on the multiple step frequency flows.

Using the step frequency flow that corresponds to the first element A4 as an example, the first item of a corresponding triplet is the first element A4. It may be learned that in S202, how to obtain the second item and the third item of the triplet is a core problem.

In this embodiment of the present application, Piecewise Linear Approximation (PLA) can be implemented on a step frequency flow by creating a piecewise linear function f and by approaching the step frequency flow by using the piecewise linear function. The process may also be referred to as a process of compressing the step frequency flow. The second item and the third item of the triplet may be used to represent a line segment in the piecewise linear function.

Figure 3:
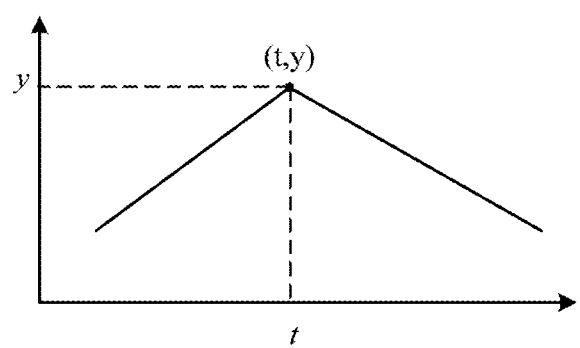
FIG. 3 is a schematic diagram of a continuous piecewise linear function.
Figure 4:
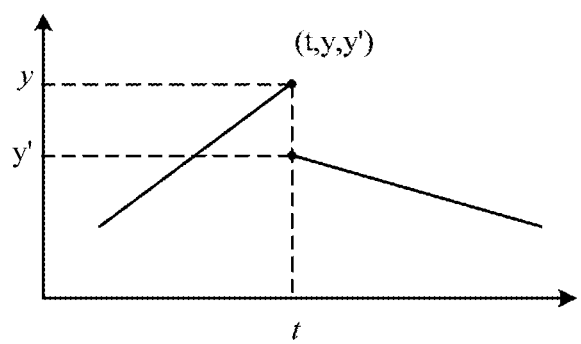
FIG. 4 is a schematic diagram of a discontinuous piecewise linear function.

Generally, as shown in FIG. 3 and FIG. 4, the piecewise linear function may be continuous or discontinuous. It should be noted that the "continuous" or "discontinuous" herein indicates continuity or discontinuity between linear functions. Specifically, FIG. 3 shows a continuous piecewise linear function that needs to be represented by using two parameters. As shown in FIG. 3, the two parameters are (t, y). Mathematically, the two parameters may also be understood as coordinates of an inflection point of the piecewise linear function. FIG. 4 shows a discontinuous piecewise linear function that needs to be represented by using three parameters. As shown in FIG. 4, the three parameters are (t, y, y'). Alternatively, the discontinuous piecewise linear function in FIG. 4 may be represented as (t, y) and (t, y').

It should be noted that in this embodiment of the present application, a parameter is a numeral, and may be a value of an independent variable of the piecewise linear function or may be a value of a dependent variable of the piecewise linear function. A quantity of parameters is a quantity of parameters of the piecewise linear function other than an initial point and an end point.

In this embodiment of the present application, the second item of the triplet may be coordinates of a left endpoint of a line segment, and the third item may be coordinates of a right endpoint of the line segment.

In this way, in a process of collecting the data flow S, the step frequency flow of the first element A4 is continuously generated, so that the step frequency flow may be further indicated by using a parameter of the piecewise linear function, that is, a corresponding triplet is obtained.

The step frequency flow that corresponds to the first element A4 may be represented as:

$$S3=\{(T_1,Y_1),(T_2,Y_2),\ldots,(T_i,Y_i),\ldots\},$$

where $Y_i=i$. In S202, a tolerable maximum error may be determined, and the error is represented as $\varepsilon$. Optionally, $\varepsilon<0.5$. For example, the error may be $\varepsilon=0.2$ or $\varepsilon=0.4$.

For any first-element data point $P_i=(T_i, Y_i)$ in the step frequency flow, according to the tolerable maximum error, $P_i^u=(T_i, Y_i+\varepsilon)$ may be determined as an upper limit, and $P_i^l=(T_i, Y_i-\varepsilon)$ may be determined as a lower limit. That is, for each first-element data point, both a corresponding upper limit point and a corresponding lower limit point can be obtained according to the maximum error. Further, an extended polygon P may be created for at least three consecutive first-element data points.

Specifically, assuming that there are n first-element data points in the step frequency flow, the extended polygon P may include an upper chain (Upper chain) U, a lower chain (Lower chain) L, an initial window (initial window), and a final window (final window). The upper chain is created according to an upper limit point, and the lower chain is created according to a lower limit point.

Figure 5:
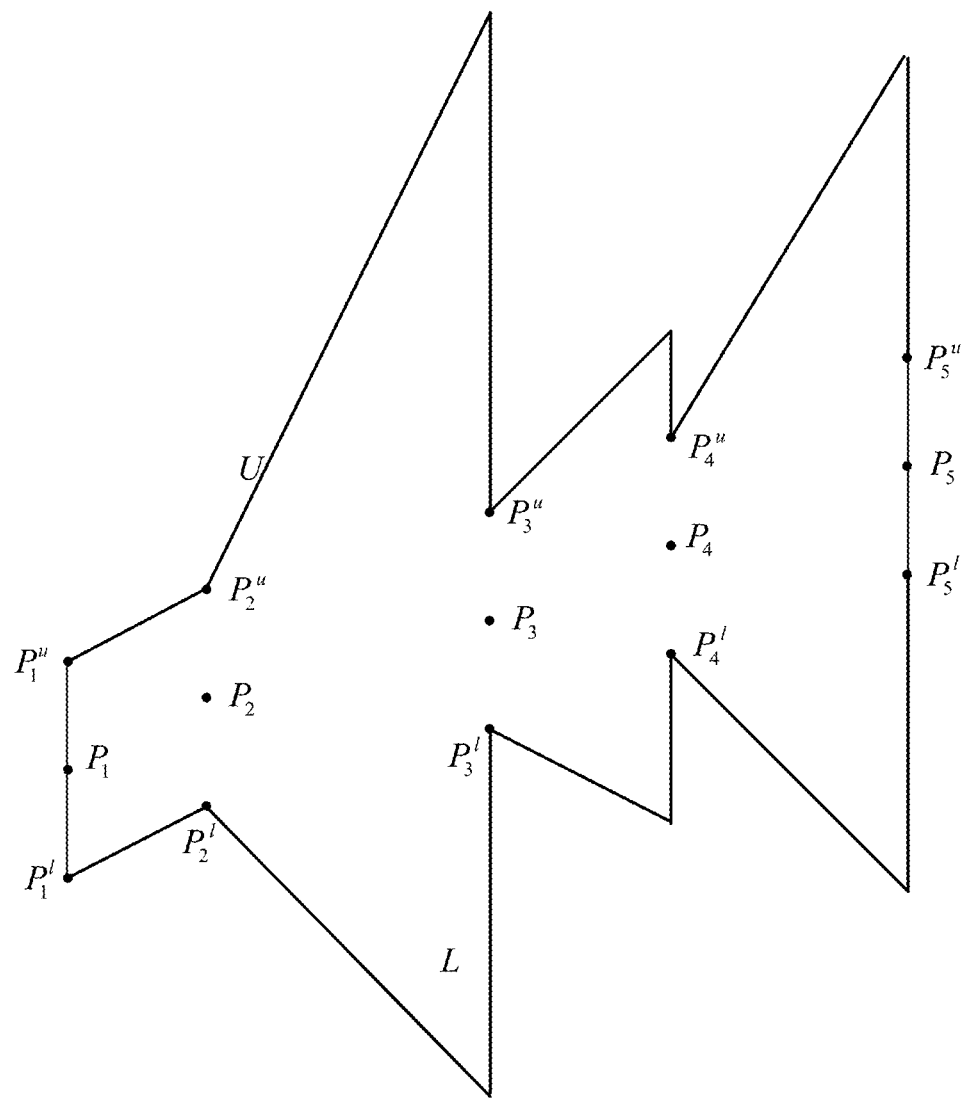
FIG. 5 shows an extended polygon formed by five data points according to an embodiment of the present application.

As shown in FIG. 5, FIG. 5 shows an extended polygon P formed by n=5 first-element data points.

If $P_i^u P_{i+1}^u$ is lower than $P_{i-1}^l P_i^u$, an upper chain between $P_i^u$ and $P_{i+1}^u$ is formed by an extension line of $P_{i-1}^l P_i^u$ and a vertical line starting from the first-element data point $P_{i+1}^u$. Similarly, if $P_i^l P_{i+1}^l$ is higher than $P_{i-1}^u P_i^l$, a lower chain between $P_i^l$ and $P_{i+1}^l$ is formed by an extension line of $P_{i-1}^u P_i^l$ and a vertical line starting from the first-element data point $P_{i+1}^l$. Specifically, in FIG. 4, an initial window is $P_1^u P_1^l$ and a final window is $P_5^u P_5^l$. An upper chain is a polyline segment from $P_1^u$ to $P_5^u$ and is denoted as U in FIG. 4. A lower chain is a polyline segment from $P_1^l$ to $P_5^l$ and is denoted as L in FIG. 4.

In this embodiment of the present application, a window is defined as a connection line segment from a point on an upper chain to a point on a lower chain in an extended polygon.

It may be understood that the extended polygon P satisfies:

$$P=\{(T,Y)|T_i \leq T \leq T_{i+1}, l_i(T) \leq Y \leq u_i(T), i=1,2,\ldots\},$$

where the expression indicates that the extended polygon P is formed by a set of all points (T, Y) that meet a condition $T_i \leq T \leq T_{i+1}$, $l_i(T) \leq Y \leq u_i(T)$, where $$l_i(T) = \begin{cases} \overline{P_i^l P_{i+1}^l}(T) & i=1 \\ \min\{\overline{P_{i-1}^u P_i^l}(x), \overline{P_i^l P_{i+1}^l}(x)\} & 2 \leq i \leq n-1 \end{cases}, \text{ and}$$

$$u_i(T) = \begin{cases} \overline{P_i^u P_{i+1}^u}(T) & i=1 \\ \min\{\overline{P_{i-1}^l P_i^u}(x), \overline{P_i^u P_{i+1}^u}(x)\} & 2 \leq i \leq n-1 \end{cases}.$$

That is, a polyline segment formed by $l_i(T)$ is the lower chain L, and a polyline segment formed by $u_i(T)$ is the upper chain U.

In this embodiment of the present application, pq represents a line segment from a first-element data point p to a first-element data point q. $\overline{pq}$ represents a straight line on which the first-element data point p and the first-element data point q are located.

For the determined extended polygon P, a visible region (visible region) of any window may be defined. In addition, the visible region is located on a right side of the window. In this embodiment of the present application, the right side refers to a direction along which time increases.

It is assumed that any window is pq, a visible region is represented as vr(pq), and any point in the visible region is visible to the window pq, that is, a connection line segment between any point in the visible region and a point in the window pq is located in the extended polygon P.

It may also be understood that if a point A is located on a right side of the window pq, and a connection line segment between the point A and a point in the window pq is located in the extended polygon P, the point A is located in the visible region vr(pq) of the window pq. Alternatively, a region formed by a set of all points A that satisfy the condition is the visible region vr(pq) of the window pq.

Further, a window on a rightmost side of the visible region vr(pq) may be referred to as a closing window (closing window) of the visible region of the window pq and may be represented as cw(vr(pq)), or may be referred to as a closing window of the window pq for short and is represented as cw(pq).

The closing window cw(pq) is extended to the window pq, and a line segment located in the visible region vr(pq) is referred to as a generation line segment of the visible region and may be represented as gen(vr(pq)). Alternatively, the line segment may be referred to as a generation line segment of the window pq for short and is represented as gen(pq). The generation line segment gen(pq) has two endpoints. One endpoint is located in the window pq, and the other endpoint is a right endpoint of the closing window cw(pq).

In addition, a data window in which a first first-element data point is located may be referred to as a next window (next window) or a next data window of the window pq and may be represented as nw(pq), and the first first-element data point is located on a right side of the closing window.

It should be noted that in this embodiment of the present application, a data window in which a first-element data point is located is a window formed by an upper limit point and a lower limit point of the first-element data point. For example, if a first-element data point is $P_i=(T_i, Y_i)$, a data window in which the first-element data point is located is $P_i^u P_i^l$. $P_i^u=(T_i, Y_i+\varepsilon)$ is an upper limit point, and $P_i^l=(T_i, Y_i-\varepsilon)$ is a lower limit point.

It may be understood that the next window does not intersect with the closing window.

Figure 6:
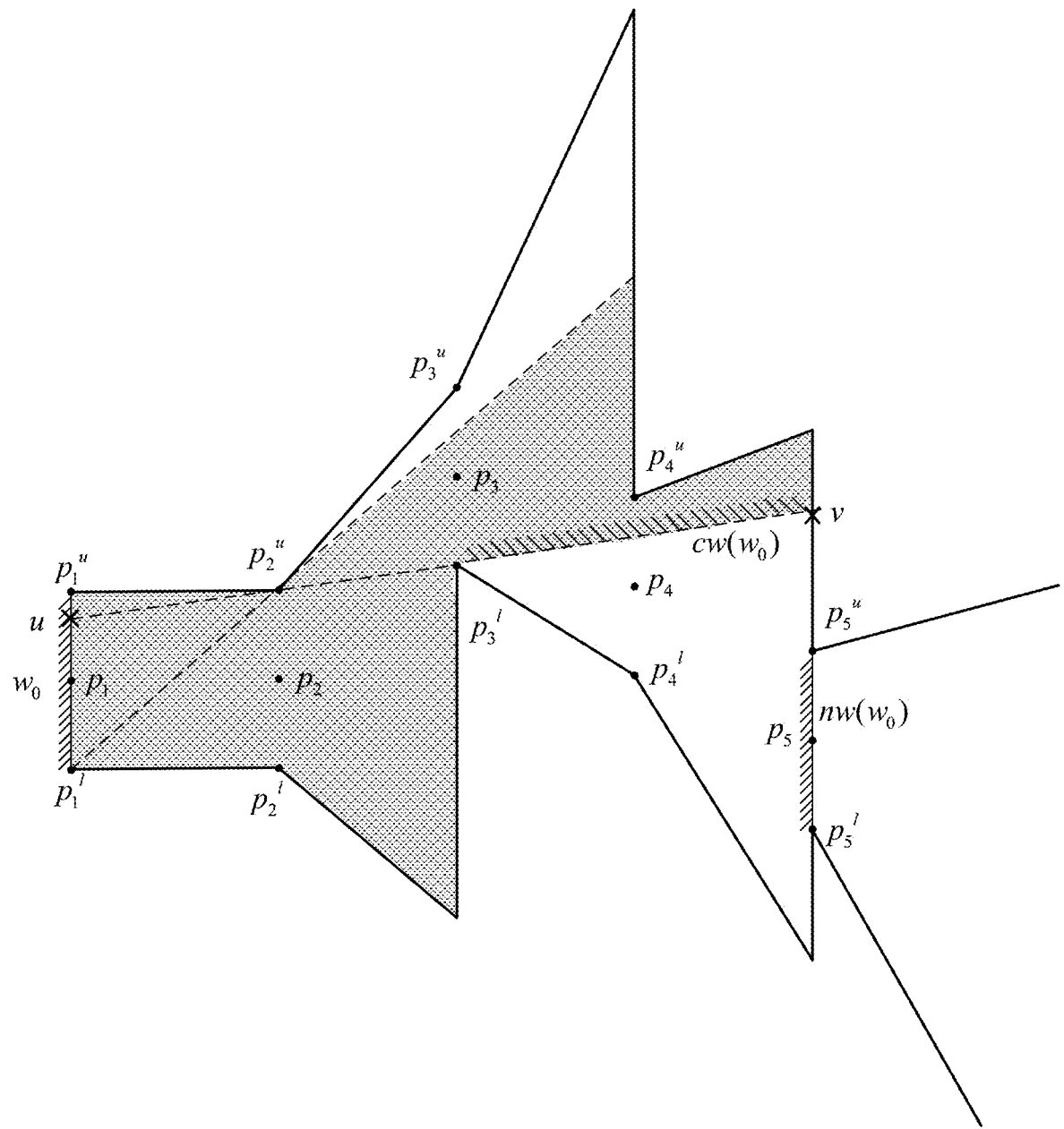
FIG. 6 is a schematic diagram of a visible region and a window according to an embodiment of the present application.
Figure 7:
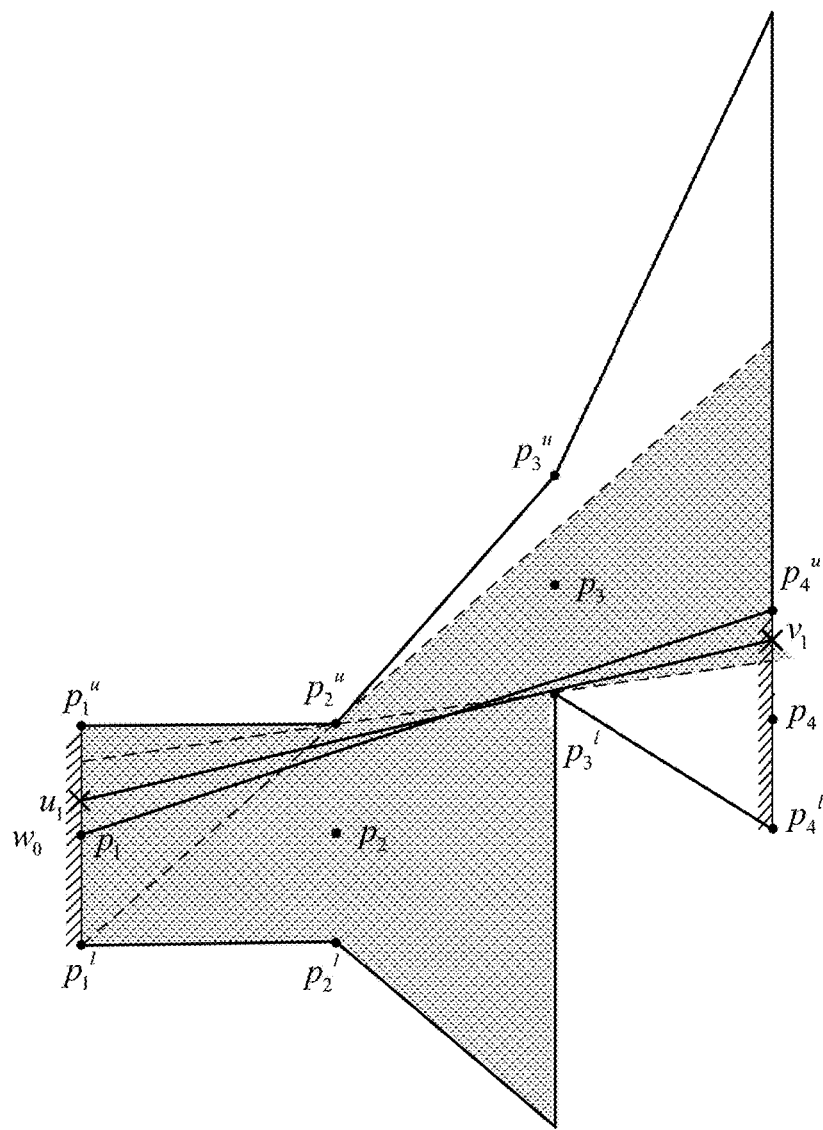
FIG. 7 is another schematic diagram of a visible region and a window according to an embodiment of the present application.

The following describes the initial window, the closing window, the next window, the visible region, and the generation line segment with reference to FIG. 6 and FIG. 7. It should be noted that data flows shown in FIG. 6 and FIG. 7 are merely examples for describing concepts of the initial window, the closing window, the next window, the visible region, and the generation line segment. Data points in the data flows in FIG. 6 and FIG. 7 are not first-element data points in step frequency flows. Y values of first-element data points in a step frequency flow increase progressively. Herein, the data points in FIG. 6 and FIG. 7 are represented as $p_1$ to $p_5$.

For example, as shown in FIG. 6, a window $p_1^u p_1^l$ is represented as $w_0$, and a shadow region is a visible region of the window $w_0$ and is represented as $vr(w_0)$. A rightmost window of the shadow region is a closing window of the visible region of the window $w_0$, that is, a window $p_3^l v$, and is represented as $cw(w_0)$. A line segment extended from the closing window to the window $P_1^u P_1^l$ is a generation line segment of the visible region or a generation line segment of the window $w_0$, that is, a line segment uv, and is represented as $gen(vr(w_0))$ or $gen(w_0)$. A data window $P_5^u P_5^l$ in which a first data point is located is a next window of the window $w_0$ and is represented as $nw(w_0)$, and the first data point is located on a right side of the closing window $p_3^l v$.

The generation line segment $gen(w_0)$ has two endpoints u and v. One endpoint u is located in the window $w_0$, and the other endpoint v is a right endpoint of the closing window $cw(w_0)$.

$nw(w_0)$ does not intersect with $cw(w_0)$.

It should be noted that, as shown in FIG. 6, the visible region $vr(w_0)$ can be determined only after the data point $p_5$ is obtained. That is, the data point $p_5$ closes the visible region. Correspondingly, it may be understood that the visible region is open (open) before the data point $p_5$ is obtained.

In other words, a visible region is open before a closing window of the visible region can be determined. The visible region is closed only after the closing window of the visible region is determined.

In this way, it may be understood that fitting may be performed on the first four data points $p_1, p_2, p_3, p_4$ in FIG. 6 by using the generation line segment $gen(w_0)$. In addition, only four parameters of two points u and v need to be used to represent the four data points $p_1, p_2, p_3, p_4$.

In addition, it may be understood that if the data point $p_4$ is the last data point of the flow data, that is, it is assumed that a window $p_4^u p_4^l$ is a final window. Because the visible region is not closed yet, flow data in the visible region may be represented by using any segment located in the visible region, for example, a line segment $u_1 v_1$ or a line segment $p_1 p_4^u$ shown in FIG. 7.

In this way, in this embodiment of the present application, an extended polygon can be created online according to the step frequency flow obtained in S201 and the maximum error. That is, the step frequency flow can be gradually obtained in a process of obtaining data points, to further and gradually create the extended polygon according to the step frequency flow. In addition, it may be understood that for any window in the extended polygon, a visible region of the any window may be determined. If a final window is not located in the visible region, a closing window and a next window of the any window may be further determined.

In addition, it can be mathematically proved that for a determined window, a closing window of a visible region of the determined window is unique, and a next window of the determined window is also unique.

In this embodiment of the present application, a reference data point for representing a step frequency flow is determined in a process of compressing the step frequency flow.

In this embodiment of the present application, in multiple triplets that correspond to the first element A4 and that are generated in S202, the first item of each triplet is the first element A4, and the second item and the third item of each triplet may be considered as a line segment, that is, the foregoing generation line segment. In S202, a corresponding line segment may be obtained by using a linked list and based on the extended polygon described above. In addition, it may be considered that line segments that correspond to the multiple triplets that correspond to the first element A4 may form a target piecewise linear function.

Specifically, the extended polygon is used to represent a region in which the multiple line segments are located. The linked list is obtained through calculation based on the extended polygon. The linked list includes an information field C[k] and a pointer field pred[k]. The information field C[k] is used to represent the multiple line segments, and the pointer field pred[k] is used to represent that the information field C[k] points to the information field C[pred[k]], where k is a non-negative integer that is not equal to 1, and C[k] that corresponds to a value of each k is used to represent one of the multiple line segments.

A manner of creating an extended polygon is described above. For details, refer to a manner of creating an extended polygon in FIG. 5. To avoid repetition, details are not described herein again. In addition, it may be understood that any line segment located in the extended polygon can satisfy a requirement of the maximum error.

Specifically, the information field and the pointer field in the linked list are determined according to the following expression:

$$C[k] = \begin{cases} cw(w_0), & \text{condition 1} \\ cw(nw(C[k-3])), & \text{condition 2} \\ cw'(C[k-2]), & \text{another condition} \end{cases}$$

where the condition 1 is k=0;

the condition 2 is k=3 or k≥5, and is located on a left side of cw(nw(C[k−3])); and for k=0, pred[0] is empty;

for k≠0, if C[k]=cw(nw(C[k−3])), pred[k]=k−3; or if C[k]=cw(C[k−2]), pred[k]=k−2, where $w_0$ is an initial window, cw(•) represents a closing window, and nw(•) represents a next window.

In this embodiment of the present application, "$\preceq$" may be used to represent a location relationship between windows. Specifically, $w_1 \preceq w_2$ means that a window $w_1$ is located on a left side of a window $w_2$, and the window $w_1$ does not intersect with the window $w_2$. In addition, it can be mathematically proved that if $w_1 \preceq w_2$, $cw(w) \preceq cw(w_2)$ is certainly satisfied.

It may be understood that if a time point corresponding to each point in the window $w_1$ is earlier than or equal to a time point corresponding to each point in the window $w_2$, $w_1 \preceq w_2$.

Correspondingly, the condition 2 may also be represented as:

$k=3$ or $k \geq 5$, and $cw(C[k-2]) \preceq cw(nw(C[k-3]))$.

In this way, in a process of obtaining data points in a data flow online, a step frequency flow of a first element can be obtained online, an extended polygon can be created online, and a linked list can be determined online.

Figure 8:
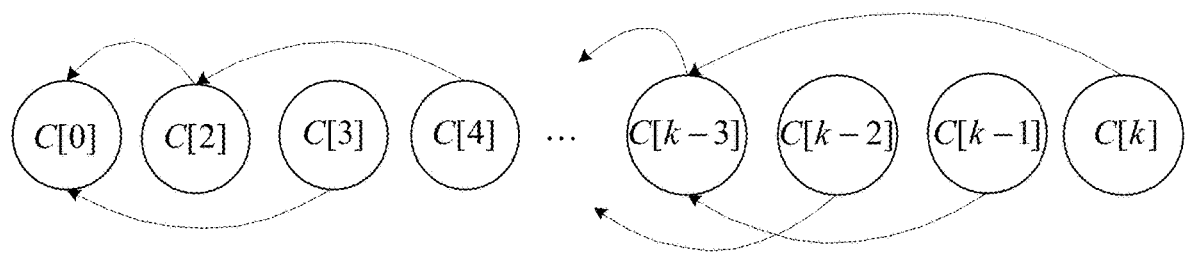
FIG. 8 is a schematic diagram of a linked list according to an embodiment of the present application.

Optionally, the linked list may be shown in FIG. 8. Arrows represent pointer fields.

Optionally, in this embodiment of the present application, the target piecewise linear function may be determined according to a direction relationship between the multiple line segments.

Optionally, in an embodiment, the linked list may be pruned (prune), so that for different values of k, values of pred[k] are not equal. The target piecewise linear function is determined according to the pruned linked list.

In this way, the linked list may be changed to a one-way linked list through pruning. That is, the pruned linked list is a one-way linked list.

A rule of pruning is limited herein, that is, for different values of k, values of pred[k] are not equal. In this way, it can be mathematically proved that a minimum quantity of parameters need to be used to perform piecewise linear approximation on the flow data by using the target piecewise linear function determined after the pruning. The target piecewise linear function includes multiple linear functions. That is, after the rule of pruning is set, it can be ensured that the target piecewise linear function has a minimum quantity of parameters. Correspondingly, it may be understood that k may represent a quantity of required parameters other than an initial point and an end point. C[k] may represent a furthermost window that can be reached by using k parameters.

It may be understood that in this embodiment of the present application, a step frequency flow of a first element may be determined after all data points of flow data are obtained, and then pruning processing is performed, or a step frequency flow of a first element may be obtained online in a process of obtaining data points online, and pruning processing is performed. For example, all linked lists corresponding to values less than k−4 are pruned online.

Figure 9:
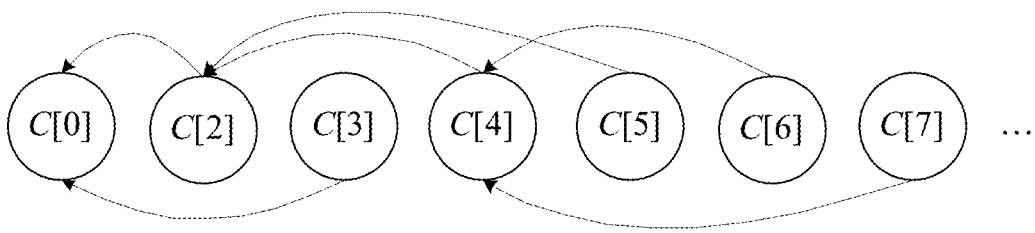
FIG. 9 is a schematic diagram of a linked list according to another embodiment of the present application.

Specifically, for any k, if pred[k]≠j, (C[j], pred[j]) is deleted from the linked list. For example, as shown in FIG. 9, if no arrow points to C[3], (C[3], pred[3]) is deleted from the linked list.

In this way, C[k] in the linked list is changed to a one-way linked list after pruning. That is, after the pruning, for different values of k, values of pred[k] are not equal.

Alternatively, optionally, in an embodiment, the linked list may further include a count field ref[k] that is used to represent a quantity of information fields C[k] that are pointed to, where ref[k] is 0, 1, or 2, and k is a non-negative integer that is not equal to 1.

Specifically,
if pred[k+2]=k and pred[k+3]=k, ref[k]=2;
if pred[k+2]=k and pred[k+3]≠k, ref[k]=1;
if pred[k+2]≠k and pred[k+3]=k, ref[k]=1; or
if pred[k+2]≠k and pred[k+3]≠k, ref[k]=0.

In a process of further pruning the linked list, if ref[j]=0, C[j], pred[j], and ref[j] may be deleted from the linked list, and ref[pred[j]] is updated at the same time, that is, ref[pred[j]] is decreased by 1.

For example, the linked list may be pruned by using the following code. The following code is PRUNE(C[•], pred[•]):

```
1: i ←k-4;
2: while i>0 and ref[i]=0 do
3: i' ←pred[i];
4: delete C[i], pred[i], and ref[i];
5: ref[i'] ←ref[i']-1;
6: i ←i';
7: end while
```

As shown in FIG. 9, neither C[5] nor C[6] points to C[3], that is, ref[3]=0. In this case, C[3], pred[3], and ref[3] are deleted from the linked list. Because C[3] points to C[0], when C[3], pred[3], and ref[3] are deleted, ref[0] is decreased by 1 at the same time.

In this way, in the pruned linked list, ref[k] of each item is equal to 1.

Specifically, the determining the target piecewise linear function according to the pruned linked list may include: using generation line segments corresponding to C[k] in the pruned linked list as the multiple linear functions, and forming the target piecewise linear function by using the multiple linear functions.

The pruned linked list is referred to as a one-way linked list, and therefore, a generation line segment corresponding to each C[k] in the one-way linked list may be determined, and all generation line segments are combined to form the target piecewise linear function. Each generation line segment corresponds to one linear function.

The generation line segment corresponding to each C[k] in the determined one-way linked list may be implemented by using the following code: EARLY-OUTPUT(C[•], pred[•]):

```
1: head ←the first entry in C[•];
2: next ←the second entry in C[•];
3: while ref[head]=1 and ref[next]=1 do
4: if next<k-3 then
5: output the corresponding piece of C[head];
6: discard C[head];
7: head ← next;
8: next ←the next entry after C[next];
9: end if
10: end while
```

That is, the multiple linear functions may be determined by correspondingly extending a line segment represented by C[k] in the pruned linked list.

Further, the second item and the third item of a triplet may be determined according to the obtained piecewise linear function. Specifically, the target piecewise linear function includes multiple linear functions. A value range of an independent variable of each of the multiple linear functions is a closed interval of time.

A triplet is determined according to each linear function, and multiple triplets that are in a one-to-one correspondence with multiple linear functions may be determined according to the multiple linear functions, so that all triplets of first elements can be obtained.

Optionally, a subset of a triplet that corresponds to the first element A4 may further be formed based on the multiple triplets. Similar to this, multiple subsets that correspond to multiple first elements may be obtained. This is not listed one by one herein.

Figure 10:
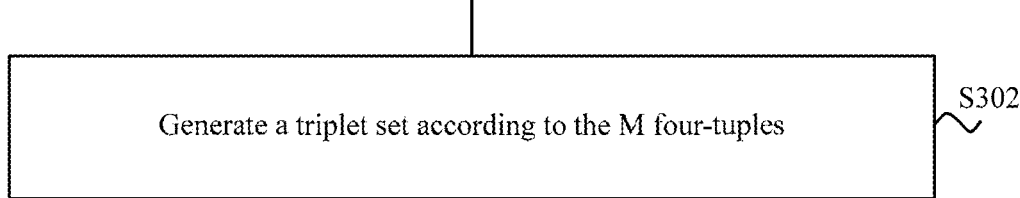
FIG. 10 is a flowchart of a method for generating a triplet set according to another embodiment of the present application.

Optionally, in another implementation, as shown in FIG. 10, S102 may include:

S301. Establish M four-tuples according to the data flow, where the first item of each of the M four-tuples is the first element, the second item is a quantity of times that the first element appears in the data flow by a current time point, the third item is an algorithm for determining the fourth item based on the data flow, the fourth item includes multiple two-tuples, the first item of each two-tuple is the first time point and the first quantity of times, and the second item is the second time point and the second quantity of times.

In an implementation, the third item of the four-tuple may be an algorithm for determining the target piecewise linear function based on the step frequency flow described above. Correspondingly, the fourth item of the four-tuple may be determined according to the third item of the four-tuple.

Optionally, the M four-tuples may be sequenced according to values of the second items of the four-tuples.

Optionally, the fourth item of each of the M four-tuples may be a triplet, that is, a triplet that corresponds to the first element in the first item.

S302. Generate the triplet set according to the M four-tuples.

Optionally, the triplet set may be generated according to the first item and the fourth item of the four-tuple.

For a four-tuple of the first element A4, the first item of a generated triplet is the first element A4, the second item of the triplet is the first item of a two-tuple, and the third item of the triplet is the second item of the two-tuple. The two-tuple is the fourth item of the four-tuple.

Optionally, the triplet generated based on the four-tuple of the first element is a subset of a triplet that is in the set and that corresponds to the first element.

Optionally, if the fourth item of each of the M four-tuples may be a triplet, the fourth item may be directly output in S302.

Specifically, S301 may include: updating the M four-tuples according to a newly obtained data point in the data flow.

It is assumed that data information of the newly obtained data point includes a collection time point of the newly obtained data point and a second element collected at the collection time point.

In an implementation, the update may include: determining whether a second element of the newly obtained data point exists in the M four-tuples; and if the first item of a first four-tuple in the M four-tuples is the second element, updating the first four-tuple; or if the second element does not exist in the first items of the M four-tuples, adding the second element to a second four-tuple in the M four-tuples.

The updating the first four-tuple includes: increasing the second item of the first four-tuple by 1, to update the second item to new frequency of the second element; and inputting a collection time point of the newly obtained data point and the new frequency to the algorithm in the third item.

The adding the second element to a second four-tuple in the M four-tuples includes: determining the second four-tuple and updating the second four-tuple.

If in the M four-tuples, a quantity of four-tuples whose second items are greater than 0 is less than a preset threshold, the second four-tuple is a four-tuple whose second item is equal to 0 in the M four-tuples. If in the M four-tuples, a quantity of four-tuples whose second items are greater than 0 is equal to a preset threshold, the second four-tuple is a four-tuple whose second item is the smallest in the M four-tuples.

Specifically, if in the M four-tuples, the quantity of four-tuples whose second items are greater than 0 is less than the preset threshold, the four-tuple whose second item is equal to 0 in the M four-tuples is used as the second four-tuple, the first item of the second four-tuple is updated to the second element, and the second item is updated to 1, where the third item includes a data point that includes a collection time point of the second element and the quantity of times being 1, and the fourth item is empty.

Specifically, if in the M four-tuples, the quantity of four-tuples whose second items are greater than 0 is equal to the preset threshold, multiple corresponding triplets are output according to the four-tuple whose second item is the smallest in the M four-tuples; and the four-tuple whose second item is the smallest in the M four-tuples is used as the second four-tuple, the first item of the second four-tuple is updated to the second element, and the second item is updated to a new quantity of times by increasing the second item by 1, where the third item includes a data point that includes the collection time point of the second element and the new quantity of times, and the fourth item is empty.

Optionally, if in the M four-tuples, the quantity of the four-tuples whose second items are greater than 0 is equal to the preset threshold, and the second item of the four-tuple whose second item is the smallest in the M four-tuples is less than a preset threshold (such as 1 or 3), the four-tuple whose second item is the smallest in the M four-tuples may be directly updated. That is, the first item of the four-tuple is updated to the second element, and the second item of the four-tuple is updated to the new quantity of times. The updated third item includes the data point that includes the collection time point of the second element and the new quantity of times, and the updated fourth item is empty.

That is, in a process of updating the four-tuple whose second item is the smallest, if the second item is less than the preset threshold, a triplet that corresponds to the four-tuple whose second item is the smallest may be not stored based on the four-tuple whose second item is the smallest. In this way, a quantity of first elements in a finally-stored triplet set may be less than a quantity of elements in a data flow, so that storage space can be further saved.

S301 is described in a relatively detailed manner in subsequent embodiments of the present application by using a linked list L. It may be considered that the M four-tuples is a linked list whose length is M.

The linked list L is defined in this embodiment of the present application. Further, the triplet set described above may be generated in S302 based on the linked list L. A maximum length of the linked list L is M. For example, a value of M may be $\lceil 2/\varphi_0 \rceil$, where $\varphi_0$ may be a predefined value, for example, $\varphi_0 = 10^{-3}$, and $\lceil \cdot \rceil$ represents rounding up.

Each item in the linked list L is a four-tuple (e, g_e, apx, rec), where e is an element in element space, and the element space is a set of elements that appear in a data flow; g_e is appearance frequency of the element e by a current time point; apx is a line segment generator, the line segment generator records frequency of an element by using a line segment, and one line segment may record frequency of one element at different time points; and rec is an array and is used to store a line segment output from apx. In the linked list L, these four-tuples are sequenced in descending order according to element frequency g_e. That is, it is assumed that g_e of any current item in the linked list L is not less than g_e of a next item.

Figure 11:
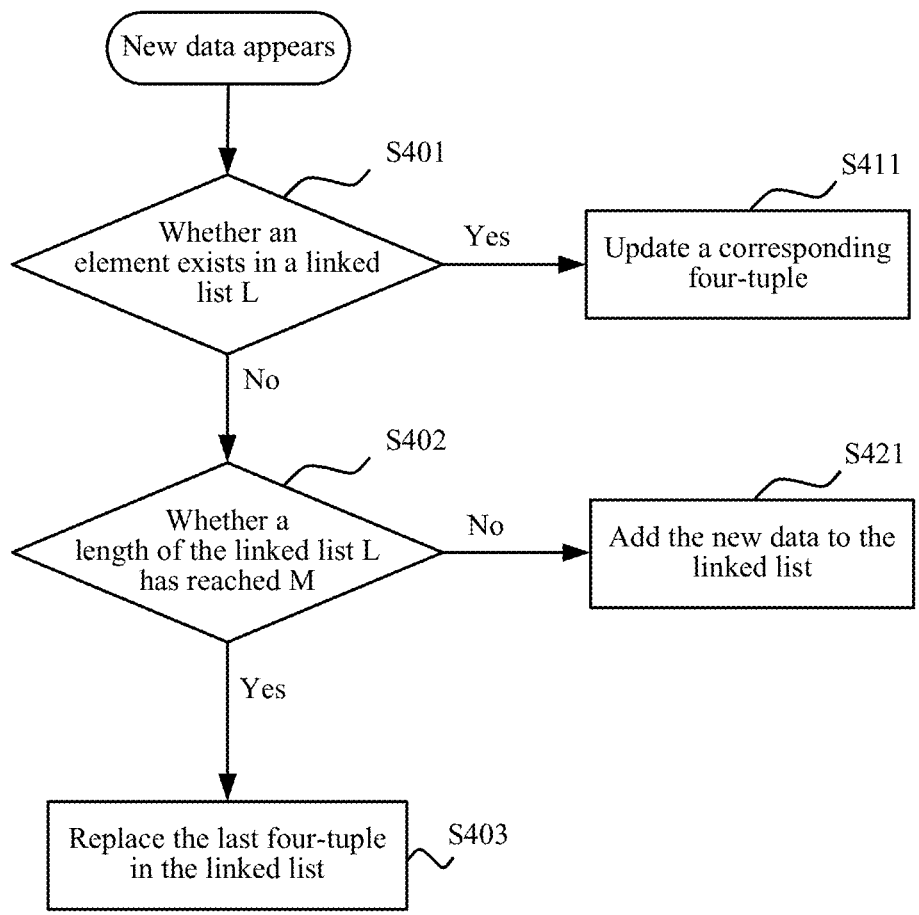
FIG. 11 is a flowchart of a method for generating a triplet set based on a linked list according to an embodiment of the present application.

An update process of the linked list L is described in a relatively detailed manner below with appearance of new data in the data flow. As shown in FIG. 11, when new data $(t_i, y_i)$ appears in the data flow, the following steps are performed.

S401. Check whether an element $y_i$ exists in a four-tuple of the linked list L.

Optionally, because items of the linked list L are sequenced according to frequency values of elements, an index may be established for four-tuples in the linked list L according to the elements of the four-tuples. In this way, the query process in S401 is performed according to the index, so that a processing speed can be improved. The index may be a dynamic balanced binary tree, and a query time point is $O(\log |L|) = O(\log 1/\varphi_0)$.

If the element $y_i$ exists in the linked list L, S411 is performed, and a four-tuple in which the element is located is updated. It is assumed that an item in the linked list L is (e, g_e, apx, rec), where $e=y_i$, frequency of the element is increased by 1, that is, g_e=g_e+1, and a location of the four-tuple (e, g_e, apx, rec) in the linked list L is updated according to g_e=g_e+1. Specifically, the update herein means performing re-sequencing according to values of g_e in the linked list L. Further, rec may be updated according to apx. Specifically, the line segment generation process is described subsequently.

If the element $y_i$ does not exist in the linked list L, that is, $y_i$ is a new element, S402 is performed.

S402. Check whether a length of the linked list L has reached M.

It may be understood that S402 is to check whether the linked list L is already full. The length of the linked list herein refers to a quantity of items included in the linked list.

If the length of the linked list L is less than M, S421 is performed, and the new data is added to the linked list L. In this case, the data that newly appears may be added to the last location of the linked list L in a form of $e=y_i$, g_e=1. Assuming that there are originally m items in the linked list L, that is, there are m elements and frequency of the m elements in the linked list L, $y_i$ may be used as an $(m+1)^{th}$ element to be added to the linked list L. Further, for the added element, corresponding apx=null, and corresponding rec is an empty array.

If the length of the linked list L already reaches M, that is, the length of the linked list is equal to M, S403 is performed.

It should be understood that "the length of the linked list L is less than M" herein may be equivalent to "in the M four-tuples, the quantity of four-tuples whose second items are greater than 0 is less than the preset threshold" described above. That "the length of the linked list L is equal to M" herein may be equivalent to "in the M four-tuples, the quantity of four-tuples whose second items are greater than 0 is equal to the preset threshold" described above. The preset threshold is equal to M.

S403. Replace an element of the last item of the linked list L with $y_i$.

Because items of the linked list L are sequenced in descending order according to the values of g_e, it may be understood that the last item of the linked list L, that is, the last four-tuple of the linked list L, is the four-tuple whose second item is the smallest in the M four-tuples.

Optionally, if the element of the last item of the linked list L is e, and frequency of the element is g_e, the element e may be replaced with $y_i$, that is, $e \rightarrow y_i$, and the frequency is increased by 1, that is, $g\_e \rightarrow g\_e+1$.

Herein, frequency of the new element $y_i$ is designated to be frequency obtained by increasing the frequency of the replaced element by 1. In this way, it is ensured that element frequency recorded in a heavy-hitter linked list needs to be greater than or equal to real frequency of the element, and it can be ensured that all heavy hitters can be found subsequently. Further, a corresponding line segment generator apx may be established for the new element. Specifically, the line segment generation process is described subsequently.

It may be learned that based on the linked list L, if the frequency of the element e in the data flow is greater than or equal to $\varphi_0 \cdot N/2$, a corresponding four-tuple (e, g_e, apx, rec) certainly exists in the linked list L. If real frequency of the element e is represented as f_e, $f\_e \leq g\_e \leq f\_e + \varphi_0 \cdot N/2$ is satisfied.

For a determined element e, a change in frequency f of the element e with time t may form a step frequency flow. That is, the change in the frequency of the element e with time is also a data flow $\{(t_1, f_1), (t_2, f_2), \ldots\}$. Therefore, a line segment may be used to approximately represent a change in frequency of a heavy hitter with time. Specifically, assuming that at a time point t, an absolute error is $\varepsilon = \varphi_0 \cdot N(t)/2$ the step frequency flow may be approximated to by using a piecewise linear function in real time, so that an approximation error is less than $\varepsilon = \varphi_0 \cdot N(t)/2$ at any time point t.

In an implementation, the piecewise linear function may be obtained by using the foregoing method for determining the target piecewise linear function; the piecewise linear function may be obtained by using a method described by J. O. Rourke in "An on-line algorithm for fitting straight lines between data ranges"; or the piecewise linear function may be obtained by using another similar method. This is not limited in the present application.

The piecewise linear function generation method described above may be referred to as a line segment generation algorithm, that is, apx in the linked list L. In the four-tuple (e, g_e, apx, rec), apx may continuously generate line segments, and rec is an array and is used to store the generated line segments. Therefore, rec is also referred to as a line segment array. Optionally, each item of rec may be a two-tuple (p, q), or each item of rec may be a triplet (e, p, q), where e represents an element in a four-tuple corresponding to the generated line segment, and p and q represent two endpoints of a line segment. Horizontal coordinates of the endpoints p and q indicate time, and vertical coordinates indicate frequency.

The following describes the update processes of apx and rec in a relatively detailed manner with reference to S401 to S403.

1. When a new four-tuple (e, g_e, apx, rec) is added to the linked list L, e and g_e are as described in S402. In this case, rec is an empty array, and apx is constructed as follows:

if $g\_e > \varphi_0 \times N$, a new line segment generator is immediately established for an element e and is stored in apx;

otherwise, apx=null.

2. When (e, g_e) in a four-tuple (e, g_e, apx, rec) in the linked list L needs to be replaced with $(y_i, g\_e+1)$, S403 is performed. Correspondingly, a new four-tuple is $(y_i, g\_e+1, apx', rec)$. An update of a line segment generator apx is as follows:

if apx!=null, apx is immediately ended, and a corresponding line segment pq (p and q are respectively a start point and an end point of the line segment) is output, that is, (e, p, q) is sequentially stored in rec, and apx'=null is set finally;

otherwise, apx'=null is directly set.

3. When frequency g_e in a four-tuple (e, g_e, apx, rec) in the linked list L jumps (that is, frequency of an element e is updated), the following update is performed:

when frequency in the four-tuple jumps to g_e at a time point t, that is, frequency changes at the time point t, it may be considered that a new data point (t, g_e) enters a step frequency flow. In this case, a). if apx=null (for example, the element is a new element) and $g\_e > \varphi_0 \times N$ (that is, the element is a heavy hitter. This is possible because that each time the last element of a heavy-hitter linked list is replaced means that frequency of the element is added to frequency of a new element through calculation), a new line segment generator apx is established, and the new frequency data point (t, g_e) is input to the line segment generator apx of the element e, so that the line segment generator apx of the element e adjusts a line segment to approximate to (t, g_e);

b). if apx!=null, (t, g_e) is input to apx, so as to update apx; and

I. when apx may still approximate to (t, g_e), nothing is done;

II. when apx cannot approximate to (t, g_e), apx outputs a line segment pq to approximate to data received before (t, g_e), and a line segment (e, p, q) is sequentially stored in an array rec;

i. if $g\_e > \varphi_0 \times N$, a line segment generator apx is re-established, and the new line segment generation module apx updates a point (t, g_e);

ii. otherwise, apx=null is set;

c). otherwise, nothing is done.

In this embodiment of the present application, the line segment generation module apx may be understood as the visible region in the foregoing method for determining the target piecewise linear function. Correspondingly, rec determined based on the line segment generation module apx may be the generation line segment of the visible region. That is, any two-tuple in rec includes a start point of the generation line segment and an end point of the generation line segment. In this case, a set of rec in all four-tuples may also be referred to as a line segment memory.

Correspondingly, it may be understood that apx=null means that a new data window is to start. For example, apx=null may refer to an element that newly appears in S400, or a closing window of a previous visible region may be determined and then a next data window is to start.

It may be learned that rec in each four-tuple of the linked list L may be obtained based on the linked list L, and a triplet set is generated based on the set of rec.

For a four-tuple (e, g_e, apx, rec) in the linked list L, the line segment array rec may be a two-tuple. The first item and the second item of the two-tuple may form a series of non-overlapping line segments that are sequenced in chronological order.

It should be noted that although the fourth item of a four-tuple in this embodiment of the present application is a two-tuple, a person skilled in the art may understand that the fourth item of the four-tuple may also be a triplet. The first item of the triplet is a first element, and the second item and the third item are two items of the two-tuple in the foregoing embodiment. That is, the line segment array rec in the linked list L may be a triplet. The first item of the triplet is e, and the second item and the third item may form a series of non-overlapping line segments that are sequenced in chronological order.

Further, in an implementation, in S103, a change rule of any first element in the data flow may be determined according to all triplets that correspond to the any first element.

In this way, a time point at which an exception occurs on the first element in the data flow may be determined, so that global monitoring can be implemented on the data flow.

It may be learned that in this embodiment of the present application, a historical change rule of the data flow can be obtained by storing the triplet set, so that global monitoring can be implemented on the data flow.

Specifically, S103 may include: obtaining any first element; obtaining multiple triplets in the set that correspond to the any first element, where the first item of each of the multiple triplets that correspond to the any first element is the any first element; and determining, according to the multiple triplets that correspond to the any first element, a rule that a quantity of times that the any first element appears in the data flow changes with time.

The multiple triplets that correspond to the any first element may be all triplets or some triplets that correspond to the any first element.

For example, S103 may include: obtaining a first element A3; obtaining M1 triplets in the triplet set that correspond to the first element A3, where the first item of each of the M1 triplets is the first element A3; and determining, according to the M1 triplets, a rule that a quantity of times that the first element A3 appears in the data flow changes with time.

Specifically, the rule that the quantity of times that the first element A3 appears in the data flow changes with time is determined according to the second items and the third items of the M1 triplets.

The M1 triplets may be all triplets in the set that correspond to the first element A3, or the M1 triplets may be some triplets in the set that correspond to the first element A3.

It is assumed that all the triplets in the set that correspond to the first element A3 include M0 triplets, that is, the first items of only M0 triplets in the set are the first element A3. M1 herein may be less than or equal to M0. It may be understood that both M0 and M1 are positive integers.

If M1=M0, the change rule that corresponds to the first element A3 may be determined in a relatively precise manner. If M1<M0, the change rule that corresponds to the first element A3 may be determined more quickly.

A manner in which the M1 triplets are selected from the M0 triplets is not limited in this embodiment of the present application. For example, the M0 triplets may be sequenced according to values of first time points, and odd-numbered (or even-numbered) triplets in the M0 triplets are used as the M1 triplets.

In addition, it may be understood that if the triplet set includes multiple subsets that are in a one-to-one correspondence with multiple first elements, S103 may include: obtaining a first element A3; obtaining a subset that corresponds to the first element A3, where the first item of each triplet in the subset is the first element A3; and determining, according to the subset, a rule that a quantity of times that the first element A3 appears in the data flow changes with time.

The change rule may be determined according to all triplets (for example, M0 triplets) in the subset, or the change rule may be determined according to some triplets (for example, M1 triplets) in the subset.

Likewise, both M0 and M1 are positive integers. If M1=M0, the change rule that corresponds to the first element A3 may be determined in a relatively precise manner. If M1<M0, the change rule that corresponds to the first element A3 may be determined more quickly.

A manner in which the M1 triplets are selected from the M0 triplets is not limited in this embodiment of the present application. For example, the M0 triplets may be sequenced according to values of first time points, and odd-numbered (or even-numbered) triplets in the M0 triplets are used as the M1 triplets.

Further, in another implementation, a heavy hitter at a particular time point may be determined in S103.

To find high-frequency data from a data flow is a classical problem in signal detection. The high-frequency data is also referred to as a heavy hitter (heavy hitter). The heavy hitter plays an important role in actual application, such as network monitoring, virus detection, trend prediction, and exception analysis. As the Internet, mobile terminals, and collection devices become popular, massive data such as various kinds of user-related records (a location, a habit, a social activity, and health) and various kinds of scientific data (a device alarm, network traffic, weather broadcast, air quality, and a share price) are quickly collected. To dig a heavy hitter from the massive high-speed data is of great instructive significance in improvement of a key performance indicator (Key Performance Indicators, KPI) of a related service.

A heavy hitter is an element whose quantity of appearance times in a data flow is higher than particular frequency. For a data flow $S=\{(t_1, y_1), (t_2, y_2), \ldots, (t_i, y_i), \ldots\}$, if a high-frequency level is designated as $\varphi$, where $0<\varphi<1$, in the data flow S, it is assumed that a quantity of elements in the data flow S is N at a current time point, and only when frequency (that is, a quantity of appearance times) of an element v in the data flow including the N elements is greater than or equal to $\varphi \cdot N$, the element v is a heavy hitter at the current time point.

In common application, usually, only a heavy hitter at a current time point is considered, and if a heavy hitter at a historical time point is not recorded in time then, the heavy hitter at the historical time point cannot be queried at the current time point, leading to an information loss. For example, people may know hot spots of society by observing top 100 hot words in Sina Weibo. If people compare the hot words with hot spots of society that are at a historical time point (for example, a year ago), top 100 hot words of a year ago needs to be learned. In this case, a technology for globally detecting a heavy hitter is required.

The technology for globally detecting a heavy hitter is as follows: For a given data flow S, a designated high-frequency level $\varphi$, and any given query time point t (a current time point or earlier), all heavy hitters at the query time point t are replied.

Apparently, because the query time point t may be any earlier time point, the technology is particularly meaningful. The technology may allow people to approximately learn a frequency change curve of all hot words that appeared in the history. Because of such a global feature of time, the technology is referred to as a global monitoring technology. Querying, at a current time point, a heavy hitter that appeared at any earlier time point (including the current time point), which is also referred to as globally detecting a heavy hitter for short, is a problem raised with big data in recent years.

It may be learned that, to globally detect a heavy hitter, a heavy hitter at "each time point" and frequency of the heavy hitter need to be learned. Consequently, extremely high space overheads are required. Therefore, an actual solution is to approximately determine a heavy hitter at a time point in an allowed error range. A key challenge is how to design a data flow compression and storage manner that is both highly efficient in space and time, to reserve and efficiently query heavy-hitter information that appears at any time point.

One idea is to obtain a current heavy hitter by using a counter-based method, and to store, each time a change of the counter reaches a threshold, a value of the counter and a time point at which the change occurs. However, because a value needs to be recorded each time the counter changes to an extent, a particularly large quantity of data needs to be recorded, and storage overheads linearly increase with time.

This embodiment of the present application provides an efficient technical solution for globally detecting a heavy hitter. As described in the foregoing embodiment, heavy-hitter information in a data flow at any time point is stored by using a triplet set, so that a heavy hitter at any earlier time point can be queried at a current time point. In addition, the method is low in space overheads and can be easily implemented.

In this embodiment of the present application, it is assumed that a data flow is $S=\{(t_1, y_1), (t_2, y_2), \ldots, (t_i, y_i), \ldots\}$, where $t_i$ represents an appearance time point (that is, a collection time point) of an $i^{th}$ data point, and $y_i$ represents an element of the $i^{th}$ data point. It is assumed that a high-frequency threshold parameter designated by a user is $\varphi$, where $0<\varphi<1$. Therefore, that an element is considered as a heavy hitter at a time point t means that a quantity of times that the element appears by the time point t is not less than $\varphi \cdot N(t)$, where $N(t)$ represents a total quantity of data points by the time point t, that is, $N(t)$ represents a length of the data flow by the time point t, or $N(t)$ represents a total quantity of data points in the data flow by the time point t.

Specifically, S103 may include: obtaining a query instruction for a heavy hitter, where the query instruction includes a query time point and query frequency; determining a total quantity of data points in the data flow by the query time point; obtaining a first triplet from the set according to the query time point, where the query time point is between a first time point and a second time point of the first triplet; determining, according to the first triplet, a fourth quantity of times that corresponds to the query time point; and if the fourth quantity of times is greater than or equal to a product of the query frequency and the quantity, determining a first element that corresponds to the first triplet as a heavy hitter at the query time point.

It should be understood that the query time point herein may be any time point. For example, the query time point may be a current time point, that is, a collection time point of the last data point in the data flow; or the query time point may be any time point earlier than a current time point. This is not limited in the present application. It should be noted that the query frequency herein is a positive number less than 1. It may be understood that if a first element is a heavy hitter, it indicates that a quantity of times that the first element appears in the data flow by the query time point is greater than or equal to the query frequency. Understanding of the heavy hitter is described in subsequent parts of this specification.

The determining a total quantity of data points in the data flow by the query time point may be performed after the first triplet is obtained from the set. The step includes: determining the quantity of data points according to all first triplets related to the query time point.

Specifically, a sum of second quantities of times of the third items of all the related first triplets may be obtained, and the sum is used as the quantity of data points; or a sum of first quantities of times of the second items of all the related triplets and second quantities of times may be obtained and then is averaged, and the averaged result is used as the quantity of data points.

In this embodiment of the present application, it may be assumed that the total quantity of data points in the data flow by the query time point is N(T).

Optionally, if the set in S102 includes multiple subsets that are in a one-to-one correspondence with multiple first elements, the obtaining a first triplet from the set according to the query time point may include: obtaining multiple first triplets, where a quantity of the multiple first triplets may be equal to or less than a quantity of the multiple subsets. That is, a maximum of one first triplet may be obtained from each subset.

As described above, if it is assumed that the quantity of the multiple first elements in the set is K1, the quantity of the first triplets obtained herein may be equal to or less than K1. Usually, the quantity is less than K1.

The determining, according to the first triplet, a fourth quantity of times that corresponds to the query time point may include: obtaining the fourth quantity of times through calculation according to the second item and the third item of the first triplet.

For example, it is assumed that a query time point is represented as T, query frequency is represented as φ, and a total quantity of data points in a data flow by the query time point T is N(T). A first triplet determined according to the query time point is (e, (Ti, fi), (Tj, fj)). The first item of the first triplet is e, the second item is (Ti, fi), and the third item is (Tj, fj). That is, e represents a first element, Ti represents a first time point, Tj represents a second time point, fi represents a first quantity of times, fj represents a second quantity of times, and Ti<T≤Tj or Ti≤T<Tj is satisfied.

A fourth quantity of times of the first element e at the query time point T may be determined according to the first triplet. For example, the fourth quantity of times may be determined as $$\frac{T-Ti}{Tj-Ti} \times (fj - fi) + fi.$$

The fourth quantity of times determined herein may be an integer or a non-integer.

Further, the fourth quantity of times (which is denoted as F01) may be compared with a product (which is denoted as F02=φ×N(T)) of the query frequency and the quantity; an integer (which is denoted as F11) obtained by rounding off the fourth quantity of times may be compared with an integer (which is denoted as F12) obtained by rounding off a product of the query frequency and the quantity; the fourth quantity of times (which is denoted as F01) may be compared with an integer (which is denoted as F12) obtained by rounding off a product of the query frequency and the quantity; or an integer (which is denoted as F11) obtained by rounding off the fourth quantity of times may be compared with a product (which is denoted as F02) of the query frequency and the quantity.

If a comparison result is that F01 is greater than or equal to F02, or a comparison result is that F11 is greater than or equal to F12, or a comparison result is that F01 is greater than or equal to F12, or a comparison result is that F11 is greater than or equal to F02, it indicates that the first element e is a heavy hitter at the query time point T.

Therefore, according to multiple first triplets, all heavy hitters that satisfy the query frequency at the query time point may be obtained.

For example, a designated time point that a user needs to perform a query is T. T may be a current time point, or may be any time point earlier than a current time point. In addition, it may be learned that a total quantity of data points in the data flow by the query time point T is N(T).

For example, query frequency may be φ. Usually, φ≥φ0 may be satisfied, for example, φ=0.05.

Optionally, a line segment array that corresponds to the query time point T may be searched for in a line segment memory (that is, a triplet set). In this embodiment of the present application, the line segment array that corresponds to the query time point T may be located by means of binary search.

It may be understood that in this case, multiple triplets may be located. For example, one triplet may be found from each subset of a triplet set, so that multiple triplets are found from multiple subsets that are in a one-to-one correspondence with multiple first elements.

It is assumed that one of the multiple triplets is a first triplet and is represented as (e, (Ti, fi), (Tj, fj)), and Ti≤T≤Tj is satisfied. In addition, Ti<Tj and fi<fj are usually satisfied.

Based on the found triplets, quantities of times of first elements that appear in the data flow and that correspond to the query time point T may be separately determined. Therefore, whether a corresponding first element is a heavy hitter may be determined.

In an example of a first triplet, if fj<φ×N(T), it may be considered that an element e of the first item of the first triplet is not a heavy hitter at the query time point T. If fj≤φ×N(T), a third quantity of times of the element e at the query time point T may be first obtained through calculation. For example, the third quantity of times may be determined as $$\frac{T-Ti}{Tj-Ti} \times (fj - fi) + fi.$$

An integer obtained by rounding off the determined third quantity of times is compared with φ×N(T). If the integer obtained by rounding off is greater than or equal to φ×N(T), it indicates that the first element e is a heavy hitter at the query time point T.

Therefore, all triplets that satisfy the query frequency may be obtained from the triplet set in a similar manner, so that all heavy hitters that satisfy the query frequency at the query time point can be further obtained.

If φ=φ$_0$, according to the foregoing establishment process of the linked list L, it may be understood that if an actual quantity of heavy hitters at the query time point T is N2, a quantity of heavy hitters obtained in this embodiment of the present application is not less than N2, and the found heavy hitters include the N2 heavy hitters that actually should be included.

For example, it is assumed that an actual heavy hitter set is {a, b, c}. A heavy hitter set determined in this embodiment of the present application may be {a, a1, b, b1, c}.

That is, all heavy hitters can be found in this embodiment of the present application, that is, recall=1. However, data that is not a heavy hitter may be determined as a heavy hitter in this embodiment of the present application, that is, precision<1.

Figure 12:
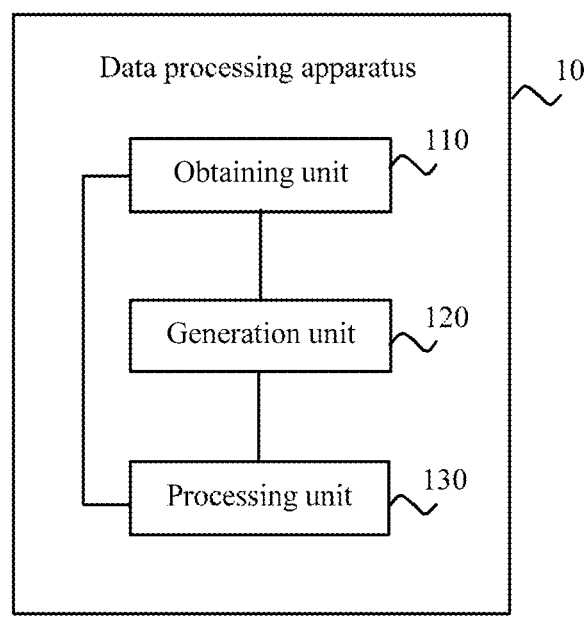
FIG. 12 is a structural block diagram of a data processing apparatus according to an embodiment of the present application.

FIG. 12 is a structural block diagram of a data processing apparatus 12 according to an embodiment of the present application. The apparatus 12 includes an obtaining unit 110, a generation unit 120, and a processing unit 130.

The obtaining unit 110 is configured to receive a data flow, where the data flow includes multiple data points, and data information of each data point includes a collection time point at which the data point is collected and an element collected at the collection time point.

The generation unit 120 is configured to generate a triplet set according to the data flow received by the obtaining unit 110, where each triplet in the set includes three items, the first item is a first element in the data flow, the second item includes a first time point at which the first element appears in the data flow and a first quantity of times that corresponds to the first time point, and the third item includes a second time point at which the first element appears in the data flow and a second quantity of times that corresponds to the second time point.

The processing unit 130 is configured to perform data processing on the data flow according to the triplet set generated by the generation unit 120.

Optionally, in an embodiment, the generation unit 120 is specifically configured to: establish, according to the data flow, multiple step frequency flows that are in a one-to-one correspondence with the multiple first elements, where each of the multiple step frequency flows includes multiple first-element data points, each first-element data point includes a third time point and a third quantity of times, the third time point is a time point at which the first element appears in the data flow, and the third quantity of times is a quantity of times that the first element appears in the data flow by the third time point; and generate the triplet set according to the multiple step frequency flows that are in a one-to-one correspondence with the multiple first elements.

The step frequency flow is also a data flow. A quantity of first-element data points included in the step frequency flow is far less than a quantity of data points in the data flow.

Optionally, in another embodiment, the generation unit 120 is specifically configured to: establish M four-tuples according to the data flow, where the first item of each of the M four-tuples is the first element, the second item is a quantity of times that the first element appears in the data flow by a current time point, the third item is an algorithm for determining the fourth item based on the data flow, the fourth item includes multiple two-tuples, the first item of each two-tuple is the first time point and the first quantity of times, and the second item is the second time point and the second quantity of times; and generate the triplet set according to the M four-tuples.

Optionally, the generation unit 120 is specifically configured to update the M four-tuples according to a newly obtained data point in the data flow.

Optionally, the generation unit 120 updates the M four-tuples, and is specifically configured to: determine whether a second element of the newly obtained data point exists in the M four-tuples; and if the first item of a first four-tuple in the M four-tuples is the second element, update the first four-tuple; or if the second element does not exist in the first items of the M four-tuples, add the second element to a second four-tuple in the M four-tuples.

The generation unit 120 updates the first four-tuple, and is specifically configured to: increase the second item of the first four-tuple by 1, to update the second item to a new quantity of times of the second element; and input a collection time point of the newly obtained data point and the new quantity of times to the algorithm in the third item.

The generation unit 120 adds the second element to the second four-tuple in the M four-tuples, and is specifically configured to: update the second four-tuple if in the M four-tuples, a quantity of four-tuples whose second items are greater than 0 is less than a preset threshold, where the second four-tuple is a four-tuple whose second item is equal to 0 in the M four-tuples; or update the second four-tuple if in the M four-tuples, a quantity of four-tuples whose second items are greater than 0 is equal to a preset threshold, where the second four-tuple is a four-tuple whose second item is the smallest in the M four-tuples.

That the generation unit 120 updates the second four-tuple if in the M four-tuples, a quantity of four-tuples whose second items are greater than 0 is less than a preset threshold includes: using the four-tuple whose second item is equal to 0 in the M four-tuples as the second four-tuple, updating the first item of the second four-tuple to the second element, and updating the second item to 1, where the third item includes a data point that includes a collection time point of the second element and the quantity of times being 1, and the fourth item is empty.

That the generation unit 120 updates the second four-tuple if in the M four-tuples, a quantity of four-tuples whose second items are greater than 0 is equal to a preset threshold includes: outputting multiple corresponding triplets according to the four-tuple whose second item is the smallest in the M four-tuples; and using the four-tuple whose second item is the smallest in the M four-tuples as the second four-tuple, updating the first item of the second four-tuple to the second element, and updating the second item to a new quantity of times by increasing the second item by 1, where the third item includes a data point that includes the collection time point of the second element and the new quantity of times, and the fourth item is empty.

Optionally, the M four-tuples are sequenced according to values of the second items of the four-tuples. In this way, in a subsequent data processing process, search and locating can be conveniently performed.

Optionally, in an embodiment, the obtaining unit 110 is further configured to obtain a query instruction for a heavy hitter, where the query instruction includes a query time point and query frequency. The processing unit 130 is further configured to determine a total quantity of data points in the data flow by the query time point. The obtaining unit 110 is further configured to obtain a first triplet from the set according to the query time point, where the query time point is between a first time point and a second time point of the first triplet. The processing unit 130 is further configured to: determine, according to the first triplet, a fourth quantity of times that corresponds to the query time point; and if the fourth quantity of times is greater than or equal to a product of the query frequency and the quantity, determine a first element that corresponds to the first triplet as a heavy hitter at the query time point. In this way, a heavy hitter that is in the data flow and that satisfies query frequency at any query time point can be obtained according to a query instruction and based on the triplet set.

Optionally, in another embodiment, the obtaining unit 110 is further configured to obtain any first element, and is further configured to obtain multiple second triplets in the set that correspond to the any first element, where the first item of each of the multiple second triplets is the any first element. The processing unit 130 is further configured to determine, according to the multiple second triplets, a rule that a quantity of times that the any first element appears in the data flow changes with time.

In this way, a change rule of frequency that any first element appears in the data flow can be obtained according to the triplet set, so that global diagnosis can be conveniently implement on the data flow.

Figure 13:
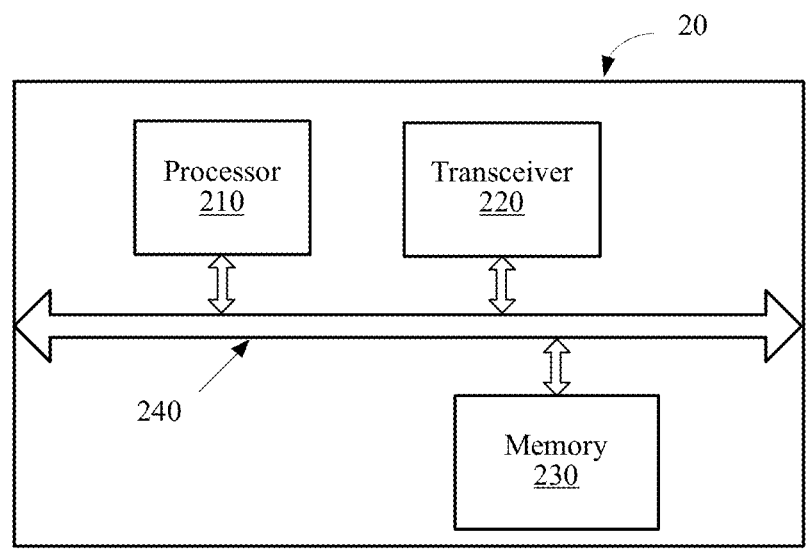
FIG. 13 is a structural block diagram of a data processing apparatus according to another embodiment of the present application.

It should be noted that in this embodiment of the present application, the obtaining unit 110 may be implemented by a receiver. The generation unit 120 and the processing unit 130 may be implemented by a processor. As shown in FIG. 13, the data processing apparatus 20 may include a processor 210, a transceiver 220, and a memory 230. The transceiver 220 may receive a data flow from another device or apparatus. The memory 230 may be configured to store code executed by the processor 210. The memory 230 may be further configured to store a triplet set.

Components of the apparatus 20 are coupled by using a bus system 240. The bus system 240 includes a power supply bus, a control bus, and a status signal bus in addition to a data bus.

The apparatus 10 shown in FIG. 12 or the apparatus 20 shown in FIG. 13 can implement the data processing processes in the foregoing method embodiments in FIG. 1 to FIG. 11. To avoid repetition, details are not described herein again.

It may be understood that the processor in this embodiment of the present application may be an integrated circuit chip and has a signal processing capability. In an implementation process, steps in the foregoing method embodiments can be completed by using a hardware integrated logical circuit in the processor, or by using instructions in a form of software. The processor may be a general purpose processor, a digital signal processor (Digital Signal Processor, DSP), an Application-Specific Integrated Circuit (ASIC), a field programmable gate array (Field Programmable Gate Array, FPGA) or another programmable logical device, a discrete gate or transistor logic device, or a discrete hardware component. The processor may implement or perform the methods, the steps, and logical block diagrams that are disclosed in the embodiments of the present application. The general purpose processor may be a microprocessor, or the processor may further be any conventional processor, or the like. Steps of the methods disclosed with reference to the embodiments of the present application may be directly performed and completed by using a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in the embodiments of the present application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memory of the systems and methods described in this specification includes but is not limited to these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A data processing method, comprising:
   receiving a data flow, wherein the data flow comprises multiple data points, and data information of each data point comprises a collection time point at which the data point is collected and an element collected at the collection time point;
   generating a triplet set according to the data flow, wherein each triplet in the triplet set comprises three items, a first item is a first element in the data flow, a second item comprises a first time point at which the first element appears in the data flow and a first quantity of times that represents a number of occurrences of the first element in the data flow by the first time point, and a third item comprises a second time point at which the first element appears in the data flow and a second quantity of times that represents a number of occurrences of the first element in the data flow by the second time point, wherein the second time point is later than the first time point; and
   performing data processing on the data flow according to the triplet set, wherein the performing data processing on the data flow according to the triplet set comprises:
      obtaining any first element;
      obtaining multiple second triplets in the triplet set that correspond to the any first element, wherein the first item of each of the multiple second triplets is the any first element; and
      determining, according to the multiple second triplets, a rule that a quantity of times that representing a number of occurrences of the any first element in the data flow changes with time.

2. The method according to claim 1, wherein the generating a triplet set according to the data flow comprises:

establishing, according to the data flow, multiple step frequency flows that are in a one-to-one correspondence with multiple first elements, wherein each of the multiple step frequency flows comprises multiple first-element data points, each first-element data point comprises a third time point and a third quantity of times, the third time point is a time point at which the first element appears in the data flow, and the third quantity of times that represents a number of occurrences of the first element in the data flow by the third time point; and generating the triplet set according to the multiple step frequency flows that are in a one-to-one correspondence with the multiple first elements.

3. The method according to claim 1, wherein the generating a triplet set according to the data flow comprises:

establishing M four-tuples according to the data flow, wherein a first item of each of the M four-tuples is the first element, a second item of the each of the M four-tuples is a quantity of times that represents a number of occurrences of the first element in the data flow by a current time point, a third item of the each of the M four-tuples is an algorithm for determining a fourth item based on the data flow, the fourth item comprises multiple two-tuples, a first item of each two-tuple is the first time point and the first quantity of times, and a second item of the each two-tuple is the second time point and the second quantity of times; and generating the triplet set according to the M four-tuples.

4. The method according to claim 3, wherein the establishing M four-tuples according to the data flow comprises:

updating the M four-tuples according to a newly obtained data point in the data flow.

5. The method according to claim 4, wherein the updating the M four-tuples according to a newly obtained data point in the data flow comprises:

determining whether a second element of the newly obtained data point exists in the M four-tuples; and if the first item of a first four-tuple in the M four-tuples is the second element, updating the first four-tuple; or if the second element does not exist in first items of the M four-tuples, adding the second element to a second four-tuple in the M four-tuples.

6. The method according to claim 5, wherein the updating the first four-tuple comprises:

increasing the second item of the first four-tuple by 1, to update the second item to a new quantity of times of the second element; and inputting a collection time point of the newly obtained data point and the new quantity of times to the algorithm in the third item.

7. The method according to claim 5, wherein the adding the second element to a second four-tuple in the M four-tuples comprises:

updating the second four-tuple if in the M four-tuples, a quantity of four-tuples whose second items are greater than 0 is less than a preset threshold, wherein the second four-tuple is a four-tuple whose second item is equal to 0 in the M four-tuples; or updating the second four-tuple if in the M four-tuples, a quantity of four-tuples whose second items are greater than 0 is equal to a preset threshold, wherein the second four-tuple is a four-tuple whose second item is the smallest in the M four-tuples.

8. The method according to claim 7, wherein the updating the second four-tuple if in the M four-tuples, a quantity of four-tuples whose second items are greater than 0 is less than a preset threshold, wherein the second four-tuple is a four-tuple whose second item is equal to 0 in the M four-tuples comprises:

using the four-tuple whose second item is equal to 0 in the M four-tuples as the second four-tuple;

updating the first item of the second four-tuple to the second element; and updating the second item to 1, wherein the third item comprises a data point that comprises a collection time point of the second element and the quantity of times being 1, and the fourth item is empty.

9. The method according to claim 7, wherein the updating the second four-tuple if in the M four-tuples, a quantity of four-tuples whose second items are greater than 0 is equal to a preset threshold, wherein the second four-tuple is a four-tuple whose second item is the smallest in the M four-tuples comprises:

outputting multiple corresponding triplets according to the four-tuple whose second item is the smallest in the M four-tuples; and using the four-tuple whose second item is the smallest in the M four-tuples as the second four-tuple;

updating the first item of the second four-tuple to the second element; and updating the second item to a new quantity of times by increasing the second item by 1, wherein the third item comprises a data point that comprises the collection time point of the second element and the new quantity of times, and the fourth item is empty.

10. The method according to claim 3, wherein the M four-tuples are sequenced according to values of second items of the M four-tuples.

11. The method according to claim 1, wherein the performing data processing on the data flow according to the triplet set comprises:

obtaining a query instruction for a heavy hitter, wherein the query instruction comprises a query time point and query frequency;

determining a total quantity of data points in the data flow by the query time point;

obtaining a first triplet from the triplet set according to the query time point, wherein the query time point is between a first time point and a second time point of the first triplet;

determining, according to the first triplet, a fourth quantity of times that represents a number of occurrences of the first element in the data flow by the query time point; and if the fourth quantity of times is greater than or equal to a product of the query frequency and the total quantity of data points, determining a first element that corresponds to the first triplet as a heavy hitter at the query time point.

12. A data processing apparatus, comprising:

at least one processor; and one or more memories coupled to the at least one processor and storing programming instructions for execution by the at least one processor to:

receive a data flow, wherein the data flow comprises multiple data points, and data information of each data point comprises a collection time point at which the data point is collected and an element collected at the collection time point;

generate a triplet set according to the data flow received, wherein each triplet in the triplet set comprises three items, a first item is a first element in the data flow, a second item comprises a first time point at which the first element appears in the data flow and a first quantity of times that represents a number of occurrences of the first element in the data flow by the first time point, and a third item comprises a second time point at which the first element appears in the data flow and a second quantity of times that represents a number of occurrences of the first element in the data flow by the second time point, wherein the second time point is later than the first time point; and perform data processing on the data flow according to the triplet set by operations that comprise:
obtaining any first element;
obtaining multiple second triplets in the triplet set that correspond to the any first element, wherein the first item of each of the multiple second triplets is the any first element; and
determining, according to the multiple second triplets, a rule that a quantity of times that representing a number of occurrences of the any first element in the data flow changes with time.

13. The apparatus according to claim 12, wherein the one or more memories further store programming instructions for execution by the at least one processor to:
establish, according to the data flow, multiple step frequency flows that are in a one-to-one correspondence with multiple first elements, wherein each of the multiple step frequency flows comprises multiple first-element data points, each first-element data point comprises a third time point and a third quantity of times, the third time point is a time point at which the first element appears in the data flow, and the third quantity of times that represents a number of occurrences of the first element in the data flow by the third time point; and
generate the triplet set according to the multiple step frequency flows that are in a one-to-one correspondence with the multiple first elements.

14. The apparatus according to claim 12, wherein the one or more memories further store programming instructions for execution by the at least one processor to:
establish M four-tuples according to the data flow, wherein the first item of each of the M four-tuples is the first element, the second item of the each of the M four-tuples is a quantity of times that represents a number of occurrences of the first element in the data flow by a current time point, the third item of the each of the M four-tuples is an algorithm for determining a fourth item based on the data flow, the fourth item comprises multiple two-tuples, a first item of each two-tuple is the first time point and the first quantity of times, and a second item of the each two-tuple is the second time point and the second quantity of times; and
generate the triplet set according to the M four-tuples.

15. The apparatus according to claim 14, wherein the one or more memories further store programming instructions for execution by the at least one processor to:
update the M four-tuples according to a newly obtained data point in the data flow.

16. The apparatus according to claim 15, wherein the one or more memories further store programming instructions for execution by the at least one processor to:
determine whether a second element of the newly obtained data point exists in the M four-tuples; and
if the first item of a first four-tuple in the M four-tuples is the second element, update the first four-tuple; or
if the second element does not exist in first items of the M four-tuples, add the second element to a second four-tuple in the M four-tuples.

17. The apparatus according to claim 16, wherein the one or more memories further store programming instructions for execution by the at least one processor to update the first four-tuple by operations comprising:
increasing the second item of the first four-tuple by 1, to update the second item to a new quantity of times of the second element; and
inputting a collection time point of the newly obtained data point and the new quantity of times to the algorithm in the third item.

18. The apparatus according to claim 16, wherein the one or more memories further store programming instructions for execution by the at least one processor to add the second four-tuple in the M four-tuples by operations comprising:
updating the second four-tuple if in the M four-tuples, a quantity of four-tuples whose second items are greater than 0 is less than a preset threshold, wherein the second four-tuple is a four-tuple whose second item is equal to 0 in the M four-tuples; or
updating the second four-tuple if in the M four-tuples, a quantity of four-tuples whose second items are greater than 0 is equal to a preset threshold, wherein the second four-tuple is a four-tuple whose second item is the smallest in the M four-tuples.

19. The apparatus according to claim 18, wherein the one or more memories further store programming instructions for execution by the at least one processor to update the second four-tuple if in the M four-tuples, a quantity of four-tuples whose second items are greater than 0 is less than a preset threshold by operations that comprises:
using the four-tuple whose second item is equal to 0 in the M four-tuples as the second four-tuple, updating the first item of the second four-tuple to the second element, and updating the second item to 1, wherein the third item comprises a data point that comprises a collection time point of the second element and the quantity of times being 1, and the fourth item is empty.

20. A non-transitory computer-readable storage medium, comprising computer program codes which when executed by at least one processor cause the at least one processor to perform a method comprising:
receiving a data flow, wherein the data flow comprises multiple data points, and data information of each data point comprises a collection time point at which the data point is collected and an element collected at the collection time point;
generating a triplet set according to the data flow, wherein each triplet in the triplet set comprises three items, a first item is a first element in the data flow, a second item comprises a first time point at which the first element appears in the data flow and a first quantity of times that represents a number of occurrences of the first element in the data flow by the first time point, and a third item comprises a second time point at which the first element appears in the data flow and a second quantity of times that represents a number of occurrences of the first element in the data flow by the second time point, wherein the second time point is later than the first time point; and
performing data processing on the data flow according to the triplet set, wherein the performing data processing on the data flow according to the triplet set comprises:
obtaining any first element;

obtaining multiple second triplets in the triplet set that correspond to the any first element, wherein the first item of each of the multiple second triplets is the any first element; and determining, according to the multiple second triplets, a rule that a quantity of times that representing a number of occurrences of the any first element in the data flow changes with time.

\* \* \* \* \*